US010255445B1

(12) United States Patent
Brinskelle

(10) Patent No.: US 10,255,445 B1
(45) Date of Patent: Apr. 9, 2019

(54) IDENTIFYING DESTINATIONS OF SENSITIVE DATA

(76) Inventor: Jeffrey E. Brinskelle, Ottawa (CA)

( * ) Notice: Subject to any disclaimer, the term of this patent is extended or adjusted under 35 U.S.C. 154(b) by 1451 days.

(21) Appl. No.: 11/934,675

(22) Filed: Nov. 2, 2007

Related U.S. Application Data

(60) Provisional application No. 60/864,360, filed on Nov. 3, 2006.

(51) Int. Cl.
*H04L 29/06* (2006.01)
*G06F 21/60* (2013.01)

(52) U.S. Cl.
CPC ........ *G06F 21/606* (2013.01); *H04L 63/0823* (2013.01); *H04L 63/083* (2013.01)

(58) Field of Classification Search
CPC ............. H04L 63/0823; H04L 63/1441; H04L 63/083; G06F 21/606; G06F 2221/2113
USPC ............................... 726/26–30; 713/150–154
See application file for complete search history.

(56) References Cited

U.S. PATENT DOCUMENTS 6,233,686 B1 * 5/2001 Zenchelsky et al. ............. 726/1
7,152,244 B2 12/2006 Toomey
7,173,933 B1 * 2/2007 O'Rourke et al. ............ 370/389
7,437,551 B2 * 10/2008 Chan et al. ................... 713/158
7,546,455 B2 * 6/2009 Kakii ............................ 713/156
8,458,776 B2 * 6/2013 Galvin .................. H04L 63/061 726/30
8,683,566 B1 * 3/2014 Gailloux ................. G06F 21/31 726/3
9,736,145 B1 * 8/2017 Hayes ................. H04L 63/0823
2003/0149667 A1 * 8/2003 Onishi ................ G06F 21/6209 705/51
2003/0167392 A1 * 9/2003 Fransdonk ............. G06F 21/10 713/156
2003/0196084 A1 * 10/2003 Okereke et al. .............. 713/156
2004/0088348 A1 * 5/2004 Yeager et al. ................ 709/202
2004/0128552 A1 7/2004 Toomey
2005/0210254 A1 * 9/2005 Gabryjelski .......... G06F 21/105 713/175
2006/0070126 A1 3/2006 Grynberg
2006/0174119 A1 8/2006 Xu
2006/0239430 A1 10/2006 Gue
2006/0291422 A1 * 12/2006 Rochford ............ H04L 63/0823 370/331

(Continued)

*Primary Examiner* — Jahangir Kabir

(57) ABSTRACT

Some embodiments of the invention may enhance security, usability, and/or efficiency for entities by identifying destination servers on behalf of the entity. In an embodiment, the destination identification may be based on secure authentication of the destination server. The entity may be a business communication agent, or a business user, or an end user. An embodiment of the invention may enhance security by preventing sensitive data from being released to unintended destination(s) and/or ensuring sensitive data is released to intended destination(s). An embodiment of the invention may improve usability by removing the need for the entity to identify the server. An embodiment of the invention may improve usability by removing the need for an entity to remember and/or specifying sensitive data. An embodiment of the invention may improve efficiency by automating the tasks of identifying the destination servers and determining whether the destination server is allowed receipt of the sensitive data. Other embodiments are also disclosed.

27 Claims, 17 Drawing Sheets

110 HTTP module
140 HTML Parser
150 Authentication Module
170
195 Communications
100 Security Agent
160 Database Communications
Database Repository
120 SSL module
180 Crypto Engine

(56) References Cited

U.S. PATENT DOCUMENTS

| | | | | |
|---|---|---|---|---|
| 2007/0061875 | A1* | 3/2007 | Le Buhan et al. | 726/10 |
| 2007/0094394 | A1 | 4/2007 | Singh | |
| 2007/0101427 | A1 | 5/2007 | Toomey | |
| 2007/0180225 | A1 | 8/2007 | Schmidt | |
| 2007/0220614 | A1 | 9/2007 | Ellis | |
| 2007/0226783 | A1 | 9/2007 | Mimlitsch | |
| 2007/0245148 | A1 | 10/2007 | Buer | |
| 2007/0245414 | A1* | 10/2007 | Chan | H04L 63/0823<br>726/12 |
| 2007/0245422 | A1 | 10/2007 | Hwang | |
| 2007/0250916 | A1 | 10/2007 | Shull | |
| 2008/0060063 | A1 | 3/2008 | Parkinson | |
| 2011/0093710 | A1* | 4/2011 | Galvin | H04L 63/061<br>713/169 |
| 2011/0116631 | A1* | 5/2011 | Shon | H04W 12/04<br>380/270 |
| 2016/0323249 | A1* | 11/2016 | Duncker | H04L 63/102 |

* cited by examiner

```
POST /login HTTP/1.0

Host=www.some.server
User-Agent=Mozilla/5.0 (Windows; U; en-US; rv:1.8)Firefox/2.0
Accept=text/xml,text/html;q=0.9,text/plain;q=0.8,image/png,*/*;q=0.5
Accept-Language=en-us,en;q=0.5
Accept-Encoding=gzip,deflate
Accept-Charset=ISO-8859-1,utf-8;q=0.7,*;q=0.7
Keep-Alive=300
Connection=keep-alive
Referer=http://www.some.server
Content-Type=application/x-www-form-urlencoded
Content-Length=53

username=MyMasterUsername&userpasswd=MyMasterPassword
```

Figure 7

```
POST /login HTTP/1.0
Host=www.some.server
User-Agent=Mozilla/5.0 (Windows; U; en-US; rv:1.8)Firefox/2.0
Accept=text/xml,text/html;q=0.9,text/plain;q=0.8,image/png,*/*;q=0.5
Accept-Language=en-us,en;q=0.5
Accept-Encoding=gzip,deflate
Accept-Charset=ISO-8859-1,utf-8;q=0.7,*;q=0.7
Keep-Alive=300
Connection=keep-alive
Referer=http://www.some.server
Content-Type=application/x-www-form-urlencoded
Content-Length=34

username=123456789&userpasswd=1111
```

Figure 8

Database Table: AllowableDestinations

| Subject | DestinationId | IssuerId | SensDataId |
|---|---|---|---|
| some.server | 3016801448e668f92bd2b295d747d82320104f3398909fd4 | 301asdf | 00001 |
| some.server2 | 3016801448e668f92bd2b295d747d82320104f3398909fd4 | 301asdf | 00002 |
| some.server | 30168014f0176213553db3ff0a006bfb508497f3ed62d01a | 301asdf | 00003 |
| login.server3 | 301680141234123412341234123412341234123412341234 | 301asdf | 00004 |
| secure.server3 | 301680145678567856785678567856875687568756785678 | 301asdf | 00005 |

Figure 9

Database Table: SensData

| SensDataId | SensData | Type |
|---|---|---|
| 00001 | BobSmith123 | Username |
| 00001 | OpenSesame!789 | Userpassword |
| 00002 | AliceSmith123 | Username |
| 00002 | ChocolatePie44 | Userpassword |
| 00003 | 123456789 | BankAccountNumber |
| 00003 | 1111 | BankAccountPIN |
| 00004 | BobSmith456 | Username |
| 00004 | OpenSesame!012 | Userpassword |
| 00005 | Bobsmith789 | Username |
| 00005 | OpenSesame#123 | Userpassword |

Figure 10

IDENTIFYING DESTINATIONS OF SENSITIVE DATA

RELATED APPLICATION

The present application is related to and claims priority from U.S. Provisional Patent Application entitled "IDENTIFYING DESTINATIONS OF SENSITIVE DATA BASED ON SECURE AUTHENTICATION" filed Nov. 3, 2006, Ser. No. 60/864,360, which is incorporated herein by reference.

FIELD

The present disclosure generally relates to the field of computer security. More specifically, an embodiment of the invention relates to improving the release of sensitive data online, such as for example reducing sensitive data from being released to unintended destinations.

BACKGROUND

Users are becoming disenchanted with performing financial transactions online. One of the main reasons for this disenchantment is due to the increasing number of online frauds being perpetrated. The online frauds may be sensitive data thefts or other identity thefts. Add to this that malicious attackers have the advantage of anonymity and a large number of users to attack and users have a good reason to being alarmed.

One specific type of online fraud is known as phishing where attackers fool or trick users into revealing their authentication or sensitive data. Phishing attacks may involve spoofed web pages or other forms of trickery to obtain users sensitive data.

Another type of online fraud is known as pharming where the infrastructure is manipulated possibly without the users knowledge to perform malicious acts upon the user.

Secure Sockets Layer (SSL) and Transport Layer Security (TLS) are cryptographic protocols which provide secure communications over networks such as the Internet. Various online frauds have been able to succeed despite SSL/TLS being used.

BRIEF DESCRIPTION OF THE DRAWINGS

FIG. 7 shows an HTTP request at interception by the security agent, according to an embodiment.

FIG. 8 shows an HTTP request after modification by the security agent, according to an embodiment.

FIG. 9 provides an example of the AllowableDestinations database table, according to an embodiment.

FIG. 10 provides an example of the SensData database table, according to an embodiment.

DETAILED DESCRIPTION

Figure 1:
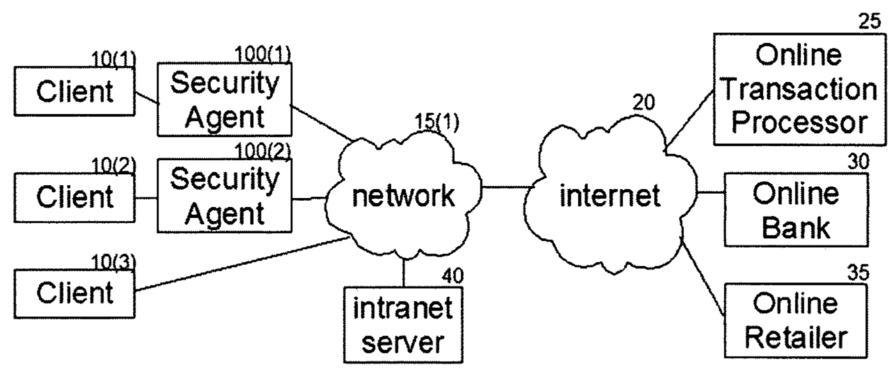
FIG. 1 illustrates a block diagram of a network configuration in accordance with an embodiment of the invention.

In accordance with some embodiments, techniques for identifying destinations of sensitive data are described. In an embodiment, some of the techniques may improve the release of sensitive data online, by for example reducing or preventing release of sensitive data to unintended destinations and/or helping to ensure sensitive data is only released to intentional destinations.

In an embodiment, attempted communications from a source (such as for example a user, a web browser, or other component) may be monitored. Communications may include an indication by the source to release sensitive data to the destination. A relationship indication (e.g., indicating a relationship between the sensitive data and the destination) may be used to determine whether the sensitive data is allowed to be released to the destination.

In another embodiment, a user indication to release sensitive data may be extracted from an hyper-text transfer protocol (HTTP) request. The HTTP request may correspond to a hyper-text markup language (HTML) form generated by the destination and transmitted to the source. An extent of sensitive data to be released may be determined based on a value stored in a storage device and the sensitive data may be inserted into the HTTP request prior to release to the destination. Additional advantages, objects, and features of embodiments of the invention are set forth in part in the detailed description which follows. It is to be understood that both the foregoing general description and the following detailed description are merely exemplary of embodiments of the invention, and are merely intended to provide an overview or framework for understanding the nature and character of embodiments of the invention.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various mechanisms, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As discussed under the background section, the problem of online fraud has been around for a number of years. To this end, some embodiments of the invention may improve security and usability by one or more of the followings (although this is not intended as an exhaustive list and reference should be made to other portions of this disclosure for additional embodiments):

- operate client-side to identify the server based on secure authentication of the server
- remove the need for the user to examine the server identification such as for example the server SSL certificate, DNS (Domain Name Server) name, IP (Internet Protocol) address, etc.
- offload the need for an entity to know, remember, or provide sensitive data
- help prevent release of sensitive data to unintentional destinations by identifying the destination before releasing the sensitive data such as for example securely identifying the server based on the servers secure authentication An embodiment of the invention may work with existing infrastructure and not require infrastructure changes. For example, some embodiments may work with backend servers or infrastructure already in place.

An embodiment of the invention may enhance security, usability, and/or efficiency for entities by identifying destination servers on behalf of an entity such as for example identifying based on the secure authentication of the destination server or a certificate or public key associated with the destination server. The entity may be a business communication agent, or a business user, or an end user. An embodiment of the invention may enhance security by preventing sensitive data from being released to unintentional destination servers and/or helping to ensure sensitive data is only released to intended destination servers, e.g., by identifying destinations before release of the sensitive data. The destination identification may be based on various factors and in some embodiments is based on secure authentication or credentials of the destination. In some embodiments identifying the destinations of sensitive data may be performed as a routine task and possibly removing the need for users to perform. An embodiment of the invention may improve usability by removing the need for the entity to identify the server. The invention may identify the destination and decide whether to release the sensitive data to the destination. A destination identifier may be used to identify the server and used to determine whether the destination is an allowable destination for the sensitive data, or determine whether the destination is a non-allowable destination for the sensitive data. The destination identification may be composed of, derived from, or combined of one or more attributes such as for example certificate, public key, subjectKeyIdentifier (SKI), authorityKeyIdentifier (AKI), serial number, certificate chain, public host key and certificate, DNS name, IP address, TCP port, UDP port, MAC address, network routing information, URL, bookmark, top level domain, Whois information, geo-location, shared secret, Identity Provider. The destination identifier may be based on the secure authentication of the server.

An embodiment of the invention removes the need for users to examine server certificates and related data such as certificate chains, revocation lists before deciding whether to release the sensitive data to the server or destination. An embodiment of the invention may remove the need for servers to use high assurance certificates. An embodiment of the invention may improve usability by removing the need for an entity to routinely remember and specify sensitive data. An embodiment of the invention may improve efficiency by automating the tasks of identifying the destination servers based on the secure authentication of the destination server and determining whether the destination server is allowed receipt of the sensitive data.

In some embodiments the security agent protects users from releasing sensitive data and/or documents containing sensitive data online by first verifying the identity of the destination server and examining a set of allowable destinations whether the sensitive data and/or documents containing sensitive data is allowed to the identified destination.

As discussed herein, the terms "business user," "business end user," "business entity," "end user," "user," or the like may be interchangeable. Additionally, reference in the specification to "one embodiment," "an embodiment," or "some embodiments" means that a particular feature, structure, or characteristic described in connection with the embodiment(s) may be included in at least an implementation. The appearances of the phrase "one embodiment" in various places in the specification may or may not be all referring to the same embodiment.

In an embodiment, sensitive data may have associated data identifying allowable destinations which the sensitive data may be securely released to. Before releasing sensitive data to a destination server, the destination server may be identified based on the secure authentication and a check may be performed to ensure the destination server is allowed to receive the sensitive data. The associated data identifying allowable destinations may include a SSL certificate, a derivation of a SSL certificate (such as a digital fingerprint of some element(s) of the certificate), extension within the SSL certificate, or a combination of any of these. The server identification may involve examination of the server authentication credentials such as for example the servers SSL certificate. In some embodiments, identifying the server may include examining at least one of: the public key of the servers SSL certificate, the servers SSL certificate signature, the SubjectKeyIdentifier extension of the servers SSL certificate, subject of the servers SSL certificate, subjectAltName of the servers SSL certificate, serial number of the servers SSL certificate, issuer of the servers SSL certificate, or any other component or derivation (such as a digital fingerprint) of the servers SSL certificate. One of the many advantages of having the operation of identifying the server on behalf of the entity is that it offloads the tedious, error-prone, or oft forgotten task from the user thereby increasing usability and security.

In one embodiment, release of sensitive data to an unintentional server may be prevented by securely identifying servers, e.g., to ensure that a destination server is allowed receipt of the sensitive data.

In some embodiments, sensitive data may have associated data identifying destinations where the sensitive data may not be released to.

In one embodiment knowledge of the sensitive data may partially or completely not reside with the user (e.g., may be removed from a user computer). As a result, sensitive data may be retrieved from a data repository and used to transform the request. The sensitive data may be stored ahead of time so that they may be available for subsequent requests. The user may specify or identify which sensitive data to release at the time of the request, or the sensitive data may be automatically determined based on the destination server. For example, the user may select the sensitive data from a provided list. Another example may be that identification of the destination server is used to lookup which sensitive data are allowed to be released to the destination server.

In one embodiment, preventative security measures may be taken by identifying the server based on secure authentication of the server and determining whether the server is allowed to be communicated with and any data to be communicated with the server. These preventative security measures may examine various server attributes such as for example the server credentials verified during the SSL/TLS handshaking with destination server. For example, in the context of securely accessing the Internet over an SSL/TLS connection, examination of the public key of the servers SSL certificate may be made to determine whether the connection is to be allowed, and as a result of this analysis further appropriate operations may be taken such as notifying the user or outright closing of the connection.

In some embodiments the techniques discussed herein may operate on the client-side to transparently, securely authenticate and/or identify the destination server in order to determine whether communication or release of sensitive data is to occur. This approach may reduce or even remove the need for users to routinely perform the sometimes non-trivial tasks such as examining the servers SSL certificate and/or its related data. Accordingly, such techniques may provide security, usability, and/or convenience benefits. Having a security agent perform these tasks may improve security simply because of the elimination of human error. Having a security agent perform these tasks may improve usability and added convenience because the user is freed from having to perform these tasks. In addition some embodiments may have the benefit of not requiring backend or server changes to the current web security infrastructure thereby allowing users to use the available systems to help prevent or reduce online fraud.

As discussed herein, the terms “server”, and “service”, and “destination”, and “destination server”, and “server destination”, or the like may be interchangeable.

As discussed herein, the terms “lookup”, and “retrieve”, or the like may be interchangeable.

As discussed herein, the terms “bind”, and “bound”, and “associated”, or the like may be interchangeable.

As discussed herein, the terms “SSL”, and “TLS”, and “SSL/TLS”, “Secure Sockets Layer”, “Transport Layer Security”, or the like may be interchangeable.

As discussed herein, the terms “relationship indicator” may refer to some indication (e.g., electrical signal, one or more bits, etc.) that two or more items may be related.

In some embodiments, a security agent may act on behalf of the user by analyzing security risks to determine whether sensitive data may be released. The security agent may or may not act in a transparent manner. Acting on behalf of the user the security agent may reside locally or remotely relative to the user and be considered client-side such as for example:

- local desktop application of user
- apparatus for the user
- within intranet, local network, service provider of user
- embedded on portable computing device
- remote service (such as for example across a network such as the Internet) that interacts with destination servers Factors for the security analysis may include but are not limited to one or more of the following:

- secure authentication and identification of destination service (such as public key of destination service, or public key certificate of destination service)
- various certificates in the certificate chain
- protocol and version (such as for example HTTP, HTTPS with SSLv2, HTTPS with SSLv3, HTTPS with TLSv1, SSHv1, etc. . . . )
- cryptographic strength (algorithm, key size, etc. . . . )
- certificate quality (such as for example SSL certificates, High Assurance certificates, etc. . . . )
- certificate usage (such as for example key usage, enhanced key usage, etc. . . . )
- Certificate Revocation List (CRL), and Authority Revocation List (ARL) checking
- computer network address of destination service such as an Internet Protocol (IP) address
- service provider (such as for example ISP, or hosting provider)
- domain name of destination service registered with an organization such as Internet Corporation for Assigned Names and Numbers (ICANN), including use of Internationalized Domain Names (IDN)
- location of server (such as for example a server based in some countries may be considered more risky)
- domain name information (such as for example age, WHOIS or other domain name related information)
- validity period of issued public key certificate Additionally, the sensitive data may factor in the security analysis.

The sensitive data may include but is not limited to items or derived from items such as:

- type of the sensitive data
- login credentials
- credit card information
- financial datasecond factor authentication (such as one-time passwords, time based tokens, grid card information)
- private cryptographic key or derivation thereof
- banking or financial institution information
- 401K data
- employee salary or payroll information
- social security number (SSN) numbers
- birth information (including birth date, birth location, etc.)
- mother’s maiden name bill invoice information
user biometric information
personal health information
confidential or secret enterprise data
document containing sensitive data
other private, personal, or identifying user information shared with limited other parties In some embodiments the user may be informed of the results of the security analysis in order to allow the user to override or not continue.

In some embodiments the user may not be informed of the results of the security analysis and the operation may be blocked or prevented from continuing.

The sensitive data may be retrieved from a data repository or may originate from the user. The data repository may be indirectly accumulated through capturing previous data sent, or may be directly accumulated through specification and manual categorization. One example is credit card numbers are accumulated when sent to one service, and thereafter detected if sent to another service.

The data repository and the sensitive data contained within may be protected through cryptographic techniques.

The user may initiate the request for the security agent to release the sensitive data, or the security agent may initiate a query with the user whether to release the sensitive data. The security agent may be situated such that it has access to or intercepts data traffic where sensitive data may be released, such as for example HTML forms, cookies, java applets, javascript, or other techniques.

The security analysis may be as simple as examining the current certificate the service is providing during an online connection, or may be as complex as the checking of several factors together. If the risk factors found are appropriate for the type of sensitive data then the sensitive data may be released.

Each user may use a number of services and initiate requests to different services. In other words, embodiments discussed herein are in no way limited to authenticating and identifying just one server-based service. This may enhance the users' online experience by removing the need for the user to remember or provide sensitive data from memory or from a location that may not be secure (such as a note in a user's desk drawer, etc.).

When communicating with a server destination often it is left to the user to identify that the server is indeed who they intend to release sensitive data to. The server identification may be composed of or derived from various factors. The server identification may originate from secure sources (such as a secure protocol), or may originate from less secure sources (such as non secure protocols).

In the case of communicating over a secure protocol a secure channel is established after an initialization phase has completed (in the example of SSL/TLS this is referred to as handshaking). The initialization phase typically involves authenticating the servers credentials (in the example of SSL/TLS this typically is the servers X.509 certificate). The operation of identifying the server using the servers credentials is left to the user and assumed that users will identify the server is who they intend to release sensitive data to.

In the case of communicating over less secure methods it may still be left to the user to identify the destination is safe to communicate with and/or is indeed who they intend to release sensitive data to.

In some embodiments the destination of the sensitive data may be an intermediary or other trusted party which may forward or communicate the sensitive data on to another entity or destination. For example, the user may intend to release sensitive data to a security provider or identity provider who may then be responsible for communicating the sensitive data further.

In some embodiments, a solution is presented to prevent or reduce online fraud in the form of a security agent. The security agent may ensure sensitive data is not released to unintentional destinations and/or ensure the sensitive data is only released to intentional destinations thus providing benefits such as improved security. The security agent may relieve the user from the sometimes non-trivial task of identifying the server based on the secure authentication of the server thus providing benefits such as improved security and improved usability. The security agent may have access to sensitive data and associated servers that are allowed access to the sensitive data. A user may signal to the security agent to release sensitive data, or a user may be queried by the security agent whether sensitive data should be released to a specific service. Security analysis of the service may be performed before the sensitive data is released thereby preventing unintended transmission of sensitive data to rogue servers. Part of the security analysis may involve identifying the server from the secure authentication of the server which may for example include examining elements of the server certificate such as the public key, signatures, subject, the certificate, or derivations of the certificate or its contents. For example, the public key or derivation of the public key of the servers SSL certificate may be used to both securely authenticate the server and then used to identify the server. Another example the SSL certificate itself or a derivation thereof may be used to identify the server. The security analysis may also involve identifying the server from other items such as for example IP addresses, DNS names, URLs, bookmarks, WHOIS information, geo-location, shared secrets.

In some embodiments to initiate the release of sensitive data a user may explicitly signal or purposely trigger the security agent by for example pressing a dialog button, selecting an item in the system tray, or pushing a button on an hardware device or apparatus.

In some embodiments a user may signal implicitly to the security agent to release sensitive data by providing their master username and master passphrase or by otherwise authenticating themselves to the security agent. In some embodiments a user may signal intention to release sensitive data by providing authentication information, an alias, other sensitive data, shared secrets, a special URL, a bookmark, or the like, In some embodiments the user may be authenticated based on another factor such as the device or network client they are using. A user may not need to provide any authentication and for example instead their smartcard, cellphone, or other hardware device authenticates itself to the security agent instead of the user.

An advantage to having the user signal their intention to release sensitive data is that the security agent can more efficiently process requests because of not having to scan network packets or requests for presence of multiple sensitive data. This may require less resources to perform.

In some embodiments, the security agent operates client-side to bind sensitive data together with the identified server information, this binded information is then used in determining whether to release the sensitive data to a securely authenticated server and the identification of that server. For example, sensitive data may bind information from the servers SSL certificate and the sensitive data together and store it in a database so that when a user requests release of sensitive data the server is securely authenticated and the servers SSL certificate is used to identify the server, and the bind information is consulted whether to allow the sensitive data to be released to the securely authenticated and identified server.

In some embodiments the security agent is implemented such that changes are not required to either the backend servers (such as for example destination websites), or to the client-side (users and web browsers). Some examples would be the security agent operating within a web proxy or firewall. Some possible benefits include:

providing backwards compatibility to existing web browsers providing backwards compatibility with existing web servers may be installed transparently. For example using network logon scripts the users web browser may be reconfigured to route traffic through a security agent running inside a web proxy Intuitive to user, fits with users mental model of entering data (such as for example into an HTML Form) and submitting data to destination Uses existing sensitive data transmission mechanisms (such as for example HTML Forms)

In some embodiments the security agent is remote from the user such as within a web proxy or firewall. Some possible benefits include:

Separating sensitive data and users. This may be useful in environments such as for example an enterprise where the sensitive data belongs to the enterprise and not the employees and by providing separation between the employees and sensitive data control is provided to the enterprise. This may enable enterprises to effectively control access to the sensitive data such as for example when employees join or depart the enterprise, or entering and leaving the premises Provide service to multiple users at once Ability to handle multiple browser platforms and versions at once In some embodiments of online browsing the security agent adds the advantage of an extra layer of defense since web browsers are vulnerable to attack. In some cases it may be the case that users are not even aware of an attack or malicious components present and the security agent may help thwart or prevent such activity.

In some embodiments the security agent is used to improve online web browsing by identifying the destination server before releasing the sensitive data and thus possibly providing protection from one or more of the following security attacks:

phishing pharming trusted root manipulation man-in-the-middle cross-site scripting redirection of HTML Forms such as for example HTML forms that are not apparent to user of destination when submitting the form Several of these security attacks may be prevented at once by having a security agent identify the destination and determine whether the destination is allowed to receive the sensitive data.

In some embodiments the security agent may remove the user from having to routinely identify the server and thus improve several aspects of online web browsing such as security, usability, and performance.

There may be times where some users cannot tell if the browser has been attacked, nor whether a man-in-the-middle has been inserted to intercept and perform malicious actions such as for example obtaining the users sensitive data to impersonate the user or otherwise malicious actions. Some embodiments the security agent securely authenticates and identifies the destination server helping to ensure the sensitive data is only released to intentional destinations. The current online security infrastructure places certain assumptions upon its users, some of these assumptions require a non-trivial amount of knowledge. For example, HTML forms in a web page may be written or manipulated and even if a user would examine the HTML to determine where the data will be sent/released it would not matter since attackers have other ways of rerouting the data after the user presses the submit button such as for example scripts may be invoked, or Internet infrastructure manipulated to reroute the data to an attacker system.

Even if a user does have the knowledge and understanding of the underlying security infrastructure fraudulent sites have been able to manipulate Certification Authorities to issue certificates and use them—even if only for a short period of time—to perpetrate their fraudulent crimes. Users may unknowingly be trusting malicious destinations. There are times where SSL server certificates should not be trusted but users are not able to determine this easily. The functionality of the security agent may help users in this area.

One or more of the functions the security agent may perform are briefly described as:

security agent may securely authenticate server, identify the server, and decide whether the destination server is allowed a specific sensitive data or a group of sensitive data security agent may transform requests by inserting sensitive data thus removing the need for the user to provide or have knowledge of the sensitive data security agent may provide the ability to follow certificate chains of server certificates, for example to work with certificate updates, renewals, or multiple certificates per domain security agent may determine whether a server is allowed to be communicated with, if not then communication is disallowed or disconnected.

In some embodiments, the security agent may provide this functionality in a transparent manner and relieve the user from these tasks. This functionality may provide enhanced usability and increased security. For example, this functionality may be specifically used to reduce online fraud such as phishing or pharming.

The security agent may have access to the data traffic through a variety of methods such as acting as a proxy between the client and the server, or integrated into a web browser or operating system, or accessing the traffic by some other techniques.

The use of a security agent may improve security.

The security agent may improve usability and the users online experience.

The embodiment of the invention shown in FIG. 1 is described in terms of how it relates to enhancing online web browser security, however some embodiments are not limited to this mode only and may apply to many other protocols than just web browsers (some examples are Secure Shell (SSH), instant messaging, Simple Mail Transfer Protocol (SMTP), SMTP Authentication (SMTP-AUTH), Internet Message Access Protocol (IMAP), Post Office Protocol (POP), Virtual Private Network (VPN), Internet Protocol Security (IPSEC), Internet Relay Chat (IRC), etc. . . . ). Also the invention may apply to areas outside of the Internet where the user may need to protect sensitive data by ensuring the sensitive data is only released to intentional destinations such as automatic teller machines (ATM's), currency converters, financial institutions, shopping stores, kiosks, wireless networks, closed networks, etc . . . .

In the embodiment shown in FIG. 1, a network component (such as for example a network proxy, a web proxy, web browser, web browser extension, network router, firewall, hardware device, desktop software application, intrusion detection/prevention system, content filter device, anti-virus system, anti-SPAM system, web security process, electronic mail filter, server, or any combination of these) may be enhanced with functionality to carry out the functions of the security agent discussed herein. More particularly, FIG. 1 illustrates an embodiment from a network perspective and shows the security agent 100 situated between a plurality of client web browsers 10 and the network 15 so that the security agent has access to, or monitors the network traffic, or network traffic is routed through the security agent 100 where the requests are analyzed and processed before being delivered on to a destination server such as but not limited to an online transaction processor 25, an online bank 30, an online retailer 35, or an intranet server 40. The components 25, 30, 35 are just some of the many examples of types of destinations on the Internet, others may include: webmail, online web services, peer-to-peer servers, community forums, organizations with members, or the like. Any of the components shown may also reside in different locations from that explicitly shown such as for example the security agent 100 may reside local to the user or web browser, or the security agent 100 may reside on the Internet or other network remote from the user or web browser. The networks may be wired or wireless or other types of networks. The client web browsers may or may not be heterogeneous such as for example PC's, RIM BlackBerry, PDA's, Bluetooth devices, WiFi devices, cellphones.

The security agent 100 may be installed on an apparatus such as a portable or removable device such as for example a USB flash drive or Bluetooth device or the like. Usage on such a device may enhance security on otherwise not completely trusted systems such as libraries, Internet cafe's, or university campuses. When the portable or removable device is inserted into the computer, the security agent 100 may be configured to automatically start and any client web browser 10 installed on the computer is automatically reconfigured to route traffic through the security agent 100. When the portable or removable device containing the security agent software is removed the secured sensitive data is unavailable thereby providing a simple and effective technique for the user to control the sensitive data when not needed.

The security agent 100 may be embedded or installed on various computing devices such desktop computers, laptops, personal digital assistants (PDAs), phones, portable computing devices (including portable networked devices), or the like. Various functionality of the security agent may enhance security and/or usability on untrusted networks such as WiFi hotspots, hotel networks, friend or relatives network.

The security agent 100 may be implemented as a web proxy (with or without SSL/TLS proxying capabilities), web browser extension, web browser, or the like. The security agent 100 may be remote or local in relation to the user. An example of a use for a remote security agent may be in an enterprise or organization setting where the security agent is centrally controlled by the enterprise or organization and is remote from one or more users for which the security agent is providing the services. The security agent reside within a web proxy or otherwise have access to or proxy traffic between users and destinations.

Figure 2:
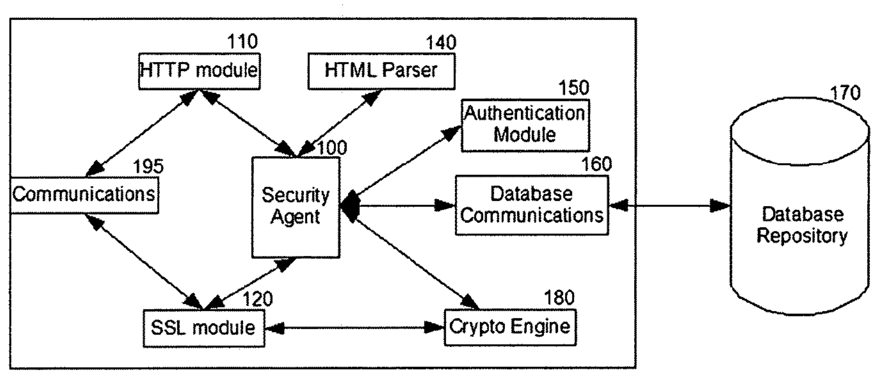
FIG. 2 illustrates further details of an embodiment of components that may be utilized in a network configuration, such as the components discussed with reference to FIG. 1.

FIG. 2 further illustrates components for an embodiment of the security agent shown in FIG. 1. The Communications component 195 may both listen for client requests and initiates communication with servers. The HTTP module 110 and the SSL module 120 both communicate with clients and servers. The security agent 100 controls the SSL module 120 and the HTTP module 110. The security agent 100 may use the HTTP module 110 for parsing, constructing, and transforming HTTP requests to be used with the SSL module 120. The security agent 100 uses the HTML Parser 140 for parsing and transforming HTML. The security agent 100 uses the authentication module to authenticate uses. The security agent 100 uses the Database Communications module 160 to interact with a database repository 170 (also referred to herein as "storage" device or unit). The storage device may be local or remote in relation to the security agent. The storage device may or may not be fronted by another service. The storage device may read and/or write data using a hard disk or using memory component. Both the security agent 100 and the SSL module 120 use the Crypto Engine 180 for cryptographic operations. The Database Repository 170 may store some of the data the security agent uses such as sensitive data, sensitive data aliases, user authentication information, the allowable destinations data such as relationship indicators between the sensitive data and allowable destinations, destination data (such as IP addresses, MAC addresses, certificates, certificate chains, URLs, domain names, and the like), trusted root certificates, cryptographic information such as keys and shared secrets, policies, configuration data, and other data.

Figure 3:
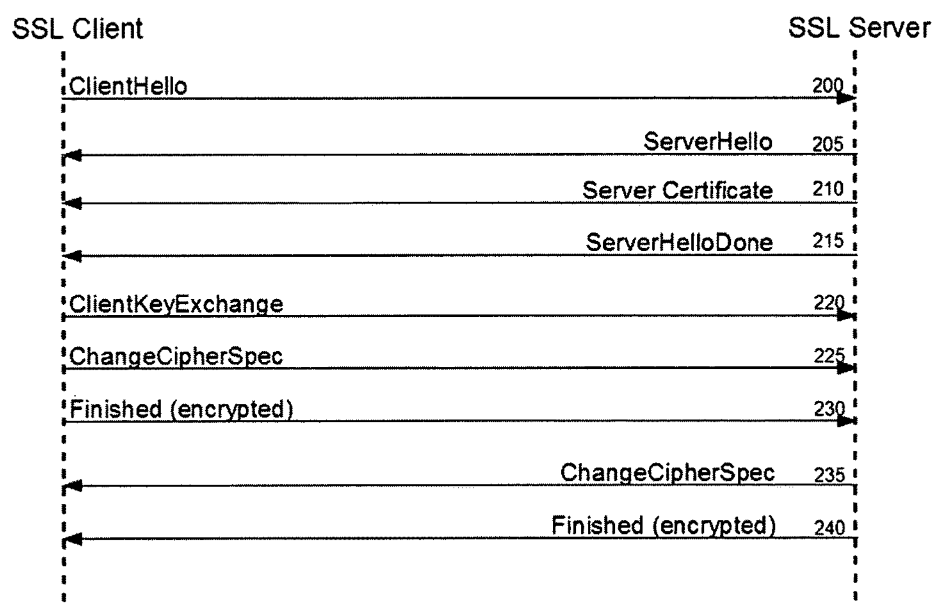
FIG. 3 is a sequence diagram illustrating an example of a SSL/TLS handshake between a SSL client and SSL server, according to an embodiment of the invention.

FIG. 3 illustrates one example of a SSL/TLS handshake. The SSL client sends a ClientHello request to the server 200. The SSL server responds with a ServerHello message 205 followed by a Certificate message containing the servers SSL certificate 210 followed by a ServerHelloDone message 215. The SSL client may optionally respond with a ClientKeyExchange message 220 followed by a ChangeCipherSpec 225 followed by a Finished message 230. The server responds with a ChangeCipherSpec 235 and a Finished message 240. Once authentication is successful and the client obtains the server SSL certificate provided in operation 210 the certificate contents may be one of the items used by the security agent to identify the server as further discussed herein, e.g., with reference to the other figures.

Figure 4:
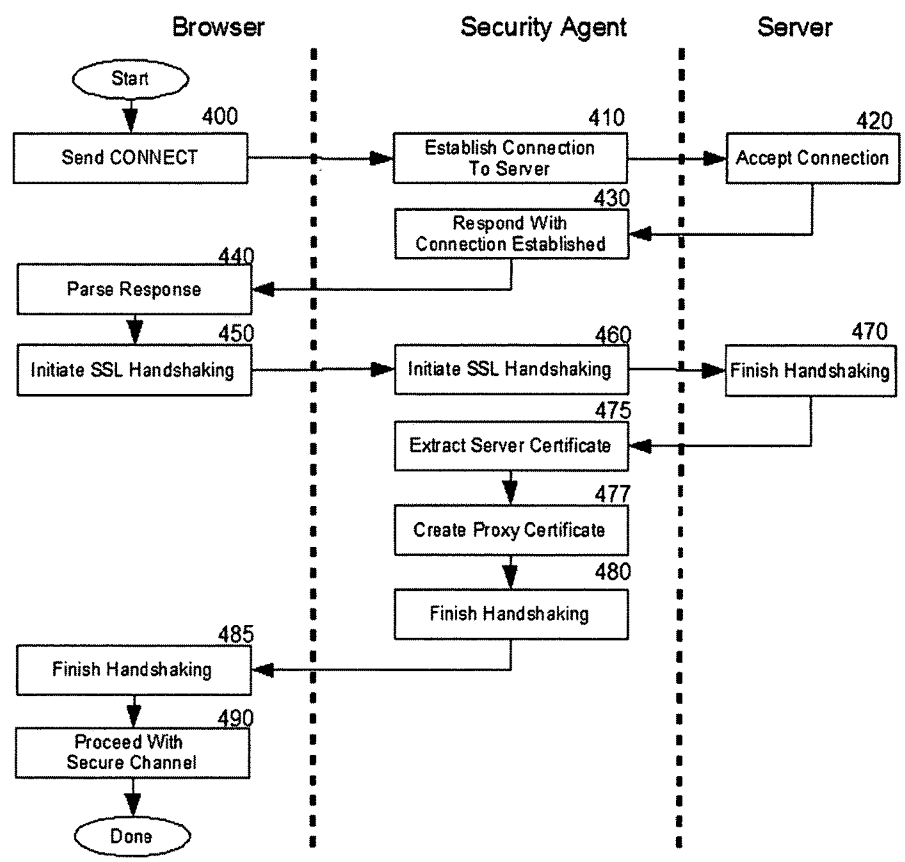
FIG. 4 is a flowchart diagram illustrating a security agent establishing secure communication channels between the browser and the destination server, in accordance with one embodiment.

FIG. 4 is an illustration of an embodiment of a method in an online web browsing environment where the security agent may access traffic between the web browser and destination server. The security agent may or may not perform this proxying in a transparent manner to the user. The security agent may be able to proxy multiple destination servers. The web browser sends an HTTP CONNECT 400 to its configured proxy. The security agent receives this HTTP CONNECT and proceeds to establish a connection to the server 410. The server accepts the connection 420 at which point the security agent responds to the browser with an HTTP connection established message 430. In some embodiments operations 410 and 420 can be performed at a later operation or not at all. The web browser receives the response and parses it 440 upon which detecting connection established it proceeds to initiate SSL handshaking 450. The security agent receives the request for SSL handshaking 460 and proceeds to initiate its own SSL handshaking with the destination 460. The destination server receives the SSL handshaking and communicates the various messages with the security agent 470 (see FIG. 3 for details on SSL handshaking messages). After the completion of SSL handshaking with the destination server, the security agent extracts the servers certificate 475 and proceeds to create its own certificate possibly using some of the details of the servers certificate 477. The certificate that the security agent creates may be signed with a trusted root certificate the web browser has in its trusted root certificate store which the security agent may have been involved in creating and inserting into the trusted root certificate store. After the proxy certificate has been created 477 the security agent finishes the SSL handshaking with the web browser using the previously created security agent credentials 480 which the web browser accepts 485. The web browser may now proceed with the secure channel just created 490.

Figure 5:
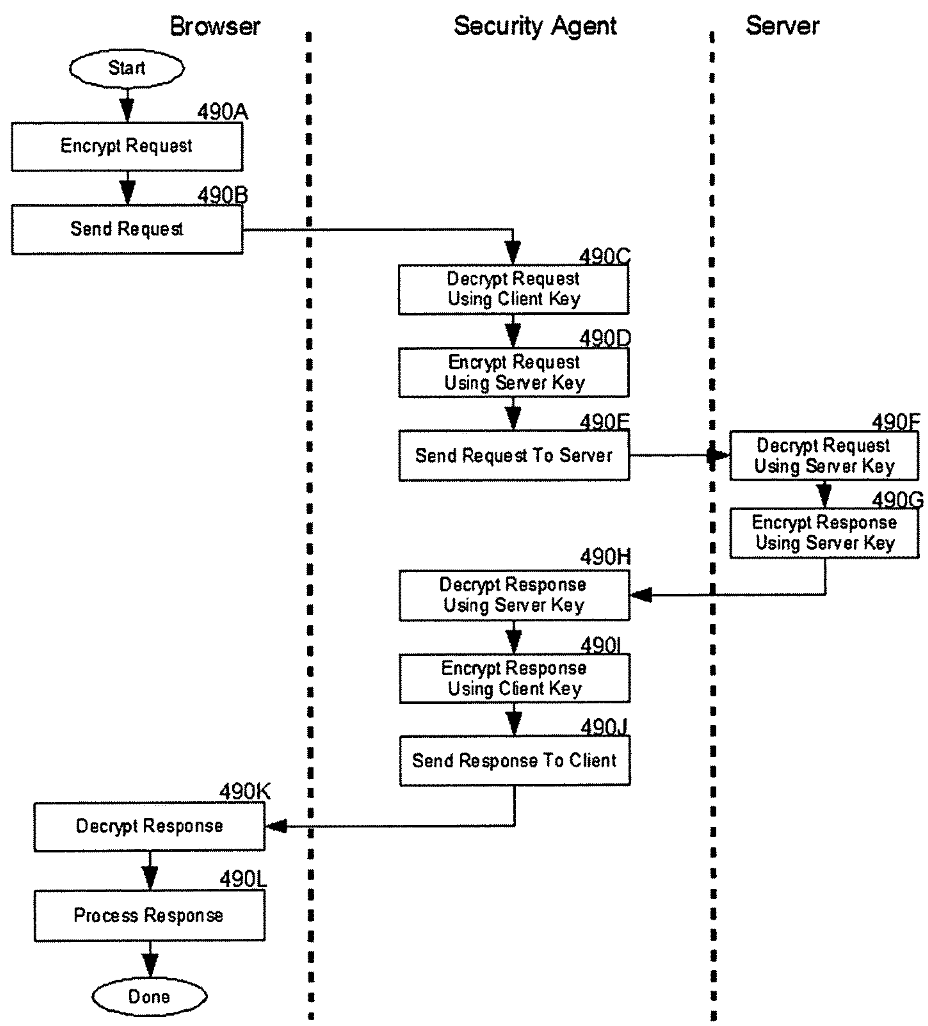
FIG. 5 is a flowchart diagram illustrating a security agent handling of encrypted request and response between a browser and destination where the security agent is able to view and/or manipulate traffic, in accordance with one embodiment.

FIG. 5 is an illustration of an embodiment of a method in an online web browsing environment where the security agent implemented as a web proxy is able to process encrypted data between the web browser and destination server after the operations of FIG. 4 have been performed. The web browser encrypts a request for the security agent in 490A and sends it on to the security agent 490B where the security agent is able to decrypt it using the session key with the client 490C and proceeds to encrypt the decrypted request using the session key with the server 490D and sends that to the destination server 490E. The server receives the request and decrypts it 490F and responds back with a response 490G which the security agent receives and decrypts 490H and proceeds to encrypt it with the client session key 4901 before sending it to the client 490J. The web browser receives and decrypts the response 490K before processing it 490L (such as displaying to user). To be clear, the security agent uses two separate keys in communicating with browser client and destination server.

FIG. 4 and FIG. 5 provide an example of a security agent implemented as a web proxy and able to transparently act as a man-in-the-middle with the ability to access data otherwise believed to be encrypted for a destination and thereby able to inspect and manipulate HTTP traffic. Although this embodiment illustrates the security agent within a web proxy, other implementations are also such as within the web browser itself, a web browser extension or add-on, a device on the network (typically client-side), or the like.

Figure 6:
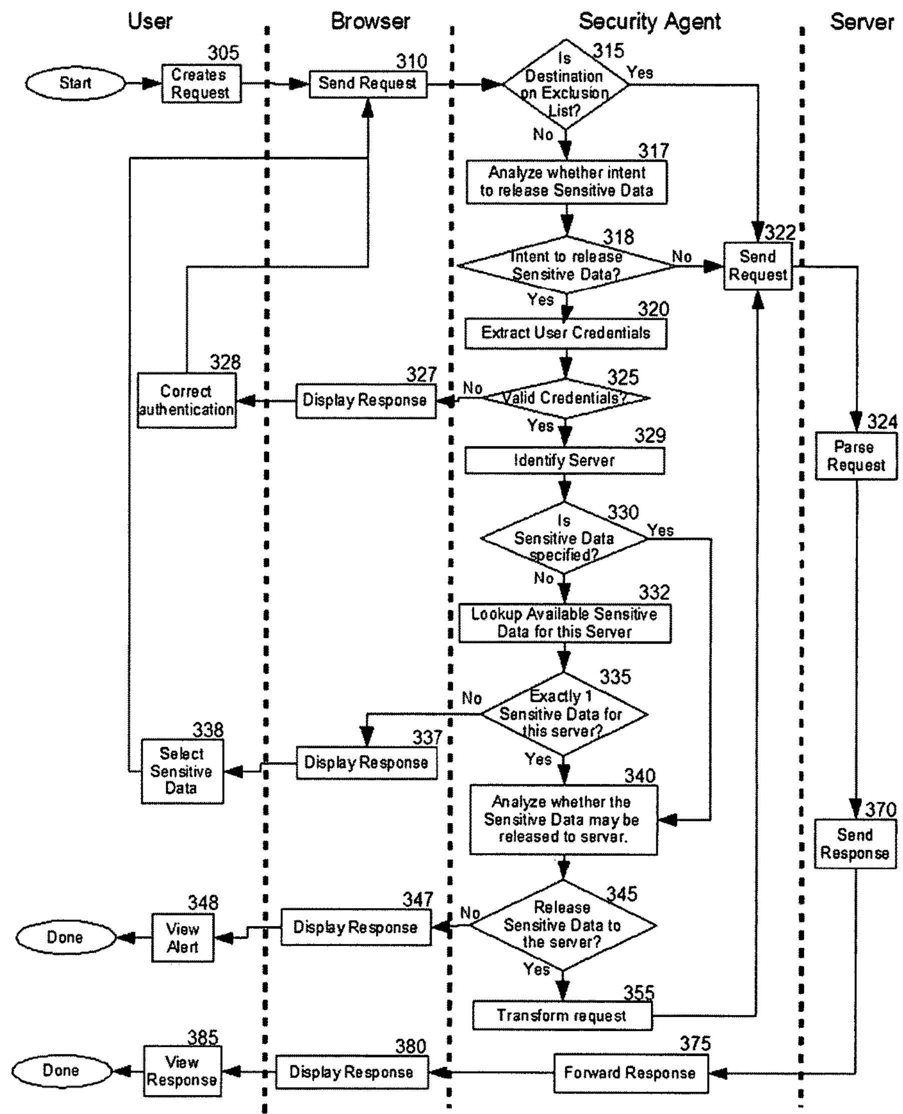
FIG. 6 is a flowchart diagram illustrating a method for processing requests from clients and interactions with servers, according to an embodiment.
Figure 13:
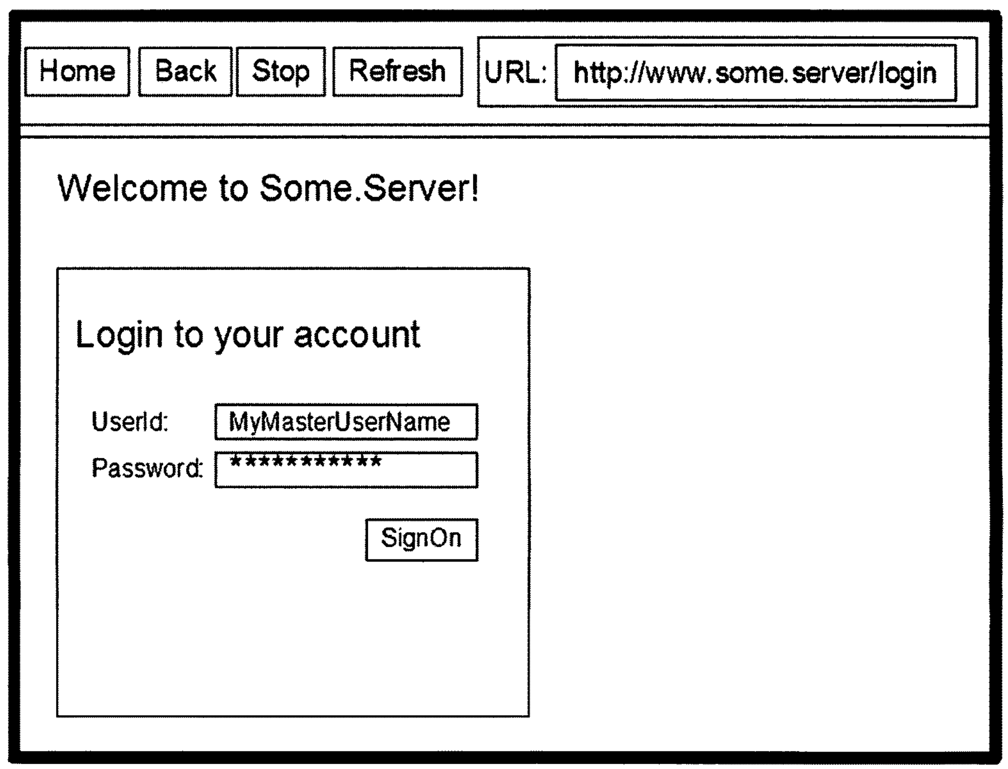
FIG. 13 is an example of a web browser login screen to a website where a users master username and master password may be used to authenticate to the security agent, according to an embodiment.
Figure 14:
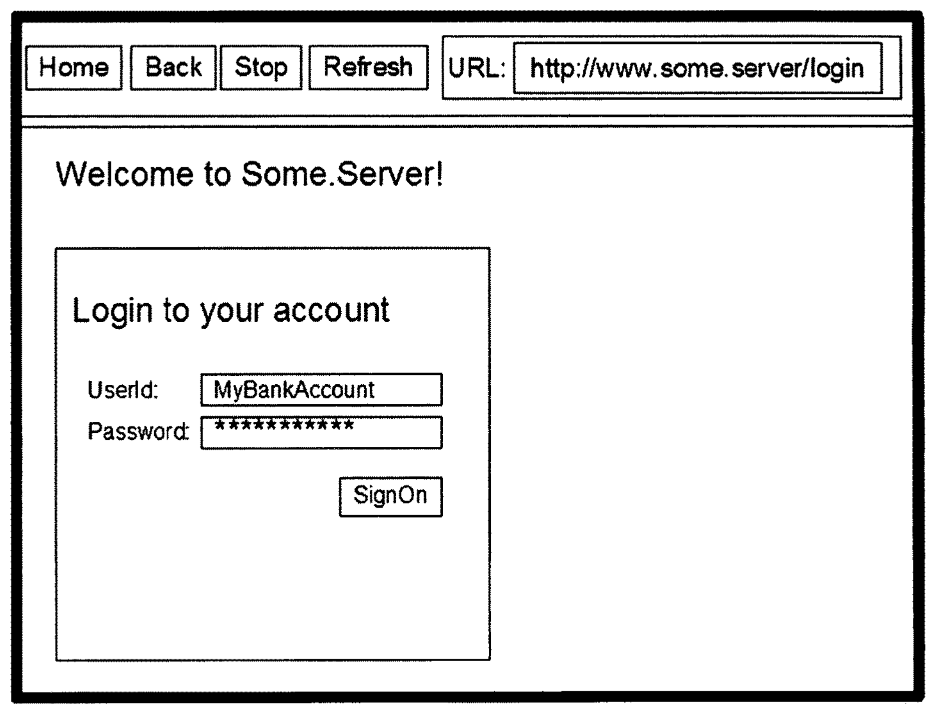
FIG. 14 is an example of a web browser login screen to a website where a user provides an alias of a sensitive data to the security agent, according to an embodiment.

FIG. 6 is an illustration of an embodiment of a method in an online web browsing environment and the processing of each request and the interactions between the user, web browser client, security agent, web server(s). In an embodiment of the invention when a user intends to release sensitive data to a server the user provides their credentials to the security agent in the mechanism provided by the server 305 (login or authentication screens as shown in FIG. 13 and FIG. 14) and operates the browser to send the request. The mechanism provided by the server may for example include HTML form, java applet, or another mechanism. The browser sends the request 310 where it is intercepted by the security agent. The security agent examines the request and determines whether the destination or URL is on an exclusion list 315 and if so then if necessary first opens a connection with the destination and sends the request on to the server 322.

If at operation 315 the request is not on the exclusion list then the request is examined whether the intent is to release sensitive data 317. The intent to release may include one or more of: detecting sensitive data that was entered by the user, a portion of sensitive data, a document containing sensitive data, users authenticating themselves by specifying their credentials to the security agent (and either inserted directly into the request or indirectly provided through some other means), sensitive data alias, a special URL, a bookmark, a special key value pair, a flag, a token, a special phrase, a sequence or combination of one or more keypresses, a command set by a component such as a browser or toolbar or javascript or extension, or other indicator by the user or client. The examination results in a decision being made 318 and if the intent is not to release sensitive data then next the request is readied to be sent on to the server 322.

If at operation 318 it is determined that it is intended to release sensitive data then next the user credentials are examined 320 and checked for validity 325 and if not valid then an appropriate response alerting the user of this fact is created and returned to the browser to display 327 for the user to correct 328.

If at operation 325 it is determined that the user credentials are valid then next the server is securely authenticated and identified based on the secure authentication 329 and the request is examined whether sensitive data was specified 330. The sensitive data may have been entered directly by the user, or an identifier identifying the sensitive data (Sensitive Data Id) entered, or partial input of the sensitive data, or a derivation of the sensitive data such as a hash specified, or the sensitive data in some other way specified or indicated by the user. If the examination results determines that sensitive data was not specified then a query is made to the repository for all available sensitive data available for the securely identified server for this SSL/TLS connection 332. Next the available sensitive data's for this server is analyzed whether there is exactly one sensitive data available for this server 335 and if not then a response is created containing all available sensitive data for the server and returned to the browser 337 to display and have the user specify the sensitive data to be released 338. At operation 335 exactly one sensitive data refers to one and only one sensitive data item that has been allowed for release to the server. In anther embodiment, if more than one sensitive data item is detected, the additional data item(s) may be used for release to the server.

If at operation 330 sensitive data was specified or at operation 335 there is exactly one sensitive data available for this server then next the server and connection is examined whether the specific sensitive data is allowed to be released to the server 340. Next a decision is made whether the sensitive data may be released to the server 345 which if results in a rejection to release the sensitive data to the server then an appropriate alert response is generated and returned to the browser to display 347 and for the user to view 348 where they may make a decision on what actions to perform next. The user may recognize a problem and not continue, or the user may decide to override and release the sensitive data anyways to the destination.

If at operation 345 it is determined to release the sensitive data to the server then the Sensitive Data Id is used to retrieve the sensitive data from the repository where this sensitive data is then used to transform the request 355 after which it is sent to the server 322.

After operation 322 the request is sent to the destination server where it is parsed 324 and an appropriate response is created 370 where the security agent may forward it onto the browser 375 where it is displayed 380 for the user to view 385 where they may make a decision on what actions to perform next.

Accordingly, the user may be relieved from the task of securely identifying and authenticating the server is allowed the sensitive data. Providing this in an automated fashion reduces the burden on the user. One specific example would be spoofed websites that mimic the real server and trick the user into providing their sensitive data.

The security agent may reside on a portable device such as a USB key. By providing the security agent on such a portable device may allow the user flexibility in roaming from computer to computer while still having access to their sensitive data. The web browser may be configured to route traffic through the security agent on the portable device or otherwise the security agent may have access to the traffic.

Figure 6A:
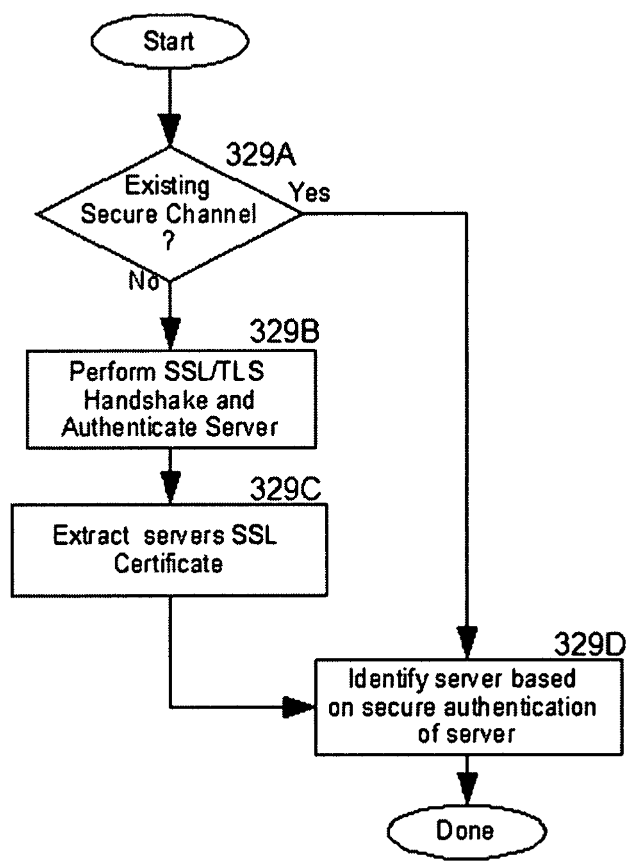
FIG. 6A is a flowchart diagram further illustrating operation 329 of FIG. 6 where the server is securely authenticated and identified based on the secure authentication, according to an embodiment.

FIG. 6A illustrates operation 329 of FIG. 6 in greater detail where the server is securely identified based on the secure authentication. It is determined whether a secure channel with the destination server already exists and is in use 329A. If a secure channel with the destination server already exists then the server identification is determine 329D from it. If a secure channel with the destination server does not already exist then a SSL/TLS session is initiated by the client and a SSL/TLS handshake is performed 329B (see FIG. 3). Once the server is securely authenticated the servers SSL certificate is used to authenticate the server is extracted 329C. The servers SSL certificate used to securely authenticate the server is used to identify the server 329D. For example, to identify the server the servers SSL certificate used to authenticate the server may be examined using one of: the SubjectKeyIdentifier extension, the public key, the certificate signature, the subjectAltName, the serial number, the full certificate or a derivation of the certificate or some component within the certificate where the derivation may be a message digest or hash. Some of these tasks (such as the cryptographic work) may be performed by a web browser or another component, while other tasks (such as identifying the server is really who they intend to release sensitive data to) may be assumed users will perform. There are various problems or concerns with having users perform some or all of these tasks.

Accordingly, having a security agent routinely perform the task of identifying the server based on the secure authentication of the server before sending sensitive data removes the need for the user to do it. This may reduce or even eliminate the possibility for the user to be tricked or fooled into giving up and sending out their sensitive data to unintentional sites. Also the use of the security agent may reduce the possibility for the user to forget checking the server before sending out sensitive data. Also having a security agent perform these tasks may improve security because of the elimination of human error. Also having a security agent perform these tasks may improve usability and added convenience because the user is freed from having to perform these tasks. Also the use of the security agent may prevent users can't be bothered to check the destination server each time. One example of where having a security agent transparently performing the task of identify servers based on the secure authentication may be applicable in a web browser environment by removing the user task of clicking on the yellow padlock in some web browsers and opening and examining the servers SSL certificate and its contents.

The authentication of the server may be performed by a component such as for example an underlying library, client application, web browser, toolbar, remote service, or even the security agent itself. In one embodiment, the security agent would perform the task of identifying the destination by examining details about the destination such as for example a certificate, public key, subjectKeyIdentifier, authorityKeyIdentifier, serial number, certificate chain, public host key and certificate, DNS name, IP address, TCP port, UDP port, MAC address, network routing information, URL, top level domain, WHOIS information, geo-location, shared secret, Identity Provider. This may reduce the stress or requirements of some users. Having a security agent perform the task of identifying the server may provide security, usability and convenience benefits. A security agent may perform these actions using various protocols or security infrastructures such as for example HTTP over SSL/TLS, remote login over SSH, or other certificate or non-certificate capable sessions where the user or end entity may identify the destination before releasing sensitive data. Having such functionality performed by a security agent instead of the user may be useful because users may not realize how important these tasks are, or cannot grasp the tasks partly due to the technical complexity (such as from the underlying security infrastructure, certificates, certificate chains, etc. . . . ), or at times simply forget to perform these operations.

Accordingly, the user may be secured from various online frauds, and not just limited to phishing emails. A variety of attacks do not need to send out malicious emails but work by subverting the infrastructure, these attacks may include arp poisoning, hosts file manipulation, pharming, DNS hijacking. In such cases the user may enter the destination website address directly and through the use of the security agent may be protected.

Hence, the security agent may improve usability, security, efficiency, and/or reduce efforts required by the user. By having the security agent perform the task of identifying the destination server based on the secure authentication of the destination server removes the need for the user to perform it. The security agent may automate portions of the task of identifying the server based on the secure authentication of the server before releasing sensitive data. For example, a user that routinely connects to their online banking or financial institution to perform tasks such as check on their balance, pay bills online, transfer funds from one account to another, or perform other financial goals may with the aid of the security agent no longer needs to concern themselves with identifying the institutions web server from the presented certificate each time they log in.

Figure 6B:
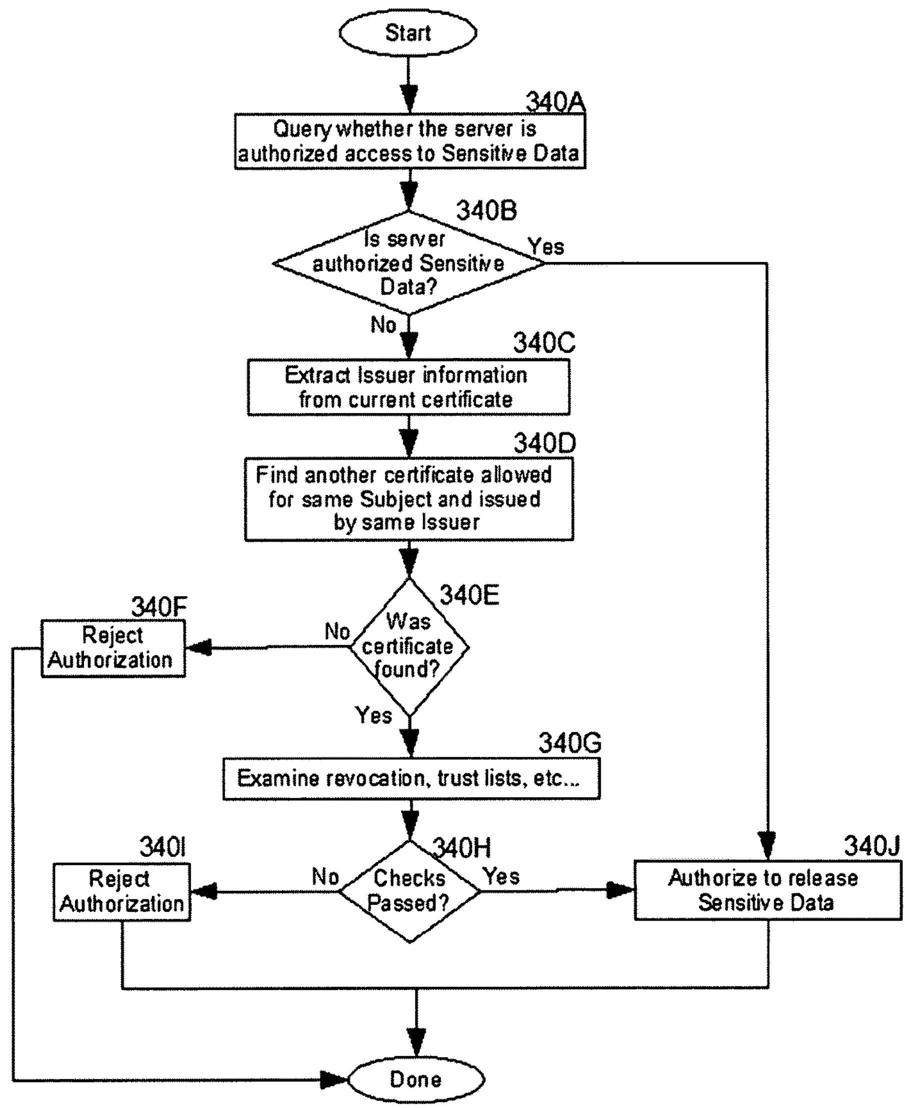
FIG. 6B is a flowchart diagram further illustrating operation 340 of FIG. 6 how a security agent determines whether the sensitive data may be released to the server, according to an embodiment.

FIG. 6B illustrates operation 340 of FIG. 6 in greater detail how the security agent may determine whether to release sensitive data to a server. A query is made to the repository to determine whether the identified server based on the secure authentication is allowed access to the sensitive data 340A. In the query the sensitive data may be specified directly, or indirectly using some identification technique such as an id or token or another sensitive data. This results in a decision whether to release sensitive data 340B if this results in a yes then the server is allowed to access to the sensitive data 340J.

If at operation 340B it is not conclusive that this server is allowed access to this sensitive data then next the Issuer and Subject information is extracted from the servers SSL certificate 340C and this information is used to search the repository for another certificate for the same Subject and issued by the same Issuer 340D and the search results are examined whether another certificate is allowed access to the sensitive data 340E and if not then the request to release the sensitive data is rejected 340F.

If at operation 340E it was determined that another certificate is allowed access to the sensitive data then various revocation and trust lists are examined 340G whether the server is allowed access to the sensitive data 340H and if not then the request is rejected 3401. A trust list may explicitly provide trusted destination(s) or it may otherwise specify allowable destinations and/or non-allowable destinations.

If at operation 340H the result of checking the various revocation and trust lists results in a pass then the request to release sensitive data to the server is allowed access 340J.

In some embodiments, the operation of searching for another certificate issued for the same subject by the same issuer may provide continuity in the events of renewed or updated certificates, in addition to certificates issued to another server in the same server farm.

Hence, some embodiments may relieve the user from having to manually identify the server and make a decision whether to release a sensitive data. Identifying the server may involve examining the servers SSL certificate obtained during the SSL/TLS protocol handshaking. Additionally, the user may not be tricked or phished into releasing a sensitive data to an unintended destination. For example, users that periodically connect to their online banking or financial institution to check their balance or perform other tasks may with the aid of the security agent no longer need to concern themselves with examining and identifying the institution's SSL certificate each time they login. Instead with the aid of the security agent the user may need to securely authenticate the server one time, this includes even if the web server updates their certificate, or has in place a web server farm using multiple certificates or a different certificate for each web server.

Further, even in the event an attacker is somehow able to gain access to the user credentials or somehow able to signal the security agent to release sensitive data, the security agent may only release sensitive data to previously decided upon destinations. With the security agent in use it may be more difficult for an attacker to trick a user into giving up their sensitive data. For example, an attacker using a cross-site scripting attack may gain access to the user credentials but not the sensitive data. Another example may be a web browser vulnerability or exploit, the attacker may gain access to the user credentials but not the sensitive data.

Figure 6C:
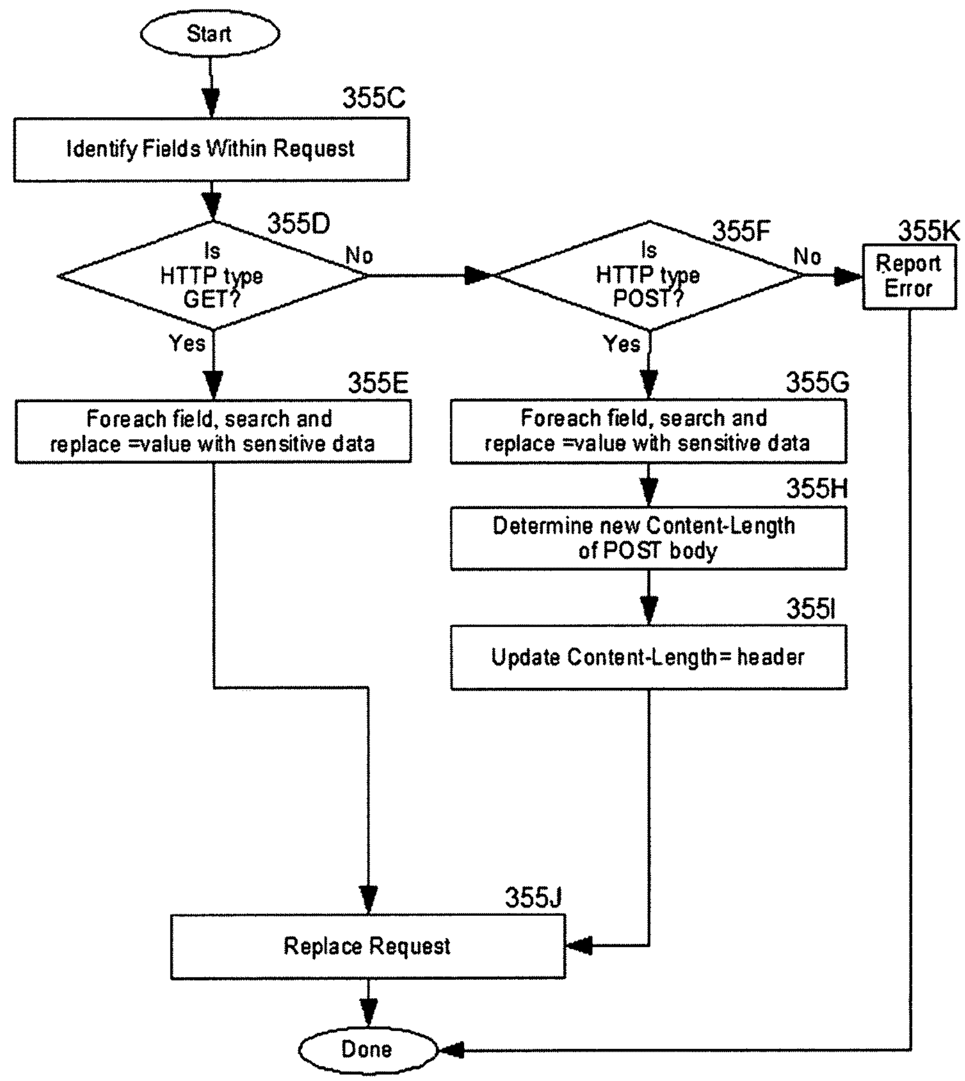
FIG. 6C is a flowchart diagram further illustrating operation 355 of FIG. 6 where the sensitive data is used to transform the request, according to an embodiment.

FIG. 6C illustrates operation 355 of FIG. 6 in greater detail where sensitive data is looked up and placed into a request. First the request is examined and fields are identified 355C and determined whether the request type is an HTTP GET request 355D. If the request type is an HTTP GET then for each field in the URL to replace the request is searched and replaced with the sensitive data 355E and the final transformed request is replaced 355J. If at operation 355D it is determined the request type is not an HTTP GET then the request type is examined whether it is an HTTP POST type 355F and if not then an error is reported 355K. If at operation 355F the request type is an HTTP POST then for each field in the POST body and if matches one of the identified fields then is replaced with the corresponding sensitive data 355G and after which the new Content-Length header is calculated 355H and updated in the request 3551 and the request is replaced 355J.

The components of FIG. 4, FIG. 5, FIG. 6, FIG. 6A, FIG. 6B, FIG. 6C comprise various elements in one possible implementation in accordance with one embodiment and may all fit together as described and shown, or parts may also operate alone.

The embodiment shown in FIG. 4, FIG. 5, FIG. 6, FIG. 6A, FIG. 6B, FIG. 6C may operate similarly for other secure protocols or scenarios, as well as using other identification means from less-secure protocols.

FIG. 7 and FIG. 8 are an example of transforming an HTTP request with the sensitive data as discussed for operation 355F. In FIG. 7 is an HTTP request from web browser where the user has specified their credentials ("MyMasterUserName" and "MyMasterUserPassphrase"). The security agent may first authenticate the user's credentials then query the repository for the appropriate sensitive data. In the example provided by FIG. 7 and FIG. 8 there is only one sensitive data for the some.server (which may map to www.some.server) as shown in the example database repository entries in FIG. 9 and FIG. 10. In this example the values of 123456789 and 1111 are then used to transform the HTTP request into the HTTP request shown in FIG. 8.

An embodiment of the invention may relieve the user from requiring to provide the sensitive data, or even knowledge of the sensitive data. This may improve usability and the user's online experience.

Additionally, this separation of user and sensitive data may allow improved management of the sensitive data for businesses and users. One example of this benefit may be in an enterprise environment where if an employee leaves the enterprise has the ability to block the user from further release of the sensitive data, thus giving the enterprise control over their sensitive data. Another example of a benefit may be providing a solution to laptop thefts and the data contained on the laptop being stolen, by separating the data and the user the enterprise may have the ability to prevent the theft of the sensitive data or further use of the sensitive data. Another example of the benefit of separating the user from the sensitive data is to help in business to business commerce by giving an enterprise the ability to delegate which employees may release sensitive data to another business all without the user having knowledge or possession of the sensitive data and thus allowing the enterprise to control the sensitive data from one central location. Another example of the benefit of separating the user from the sensitive data is providing the business the ability to ensure that employees release sensitive data only to intended destinations, both whether the employee is malicious or the destination server is malicious.

An embodiment of the invention may be used in preventing or reducing sensitive data from being released to fraudulent or malicious destinations. An embodiment of the invention may reside in a network, Internet, or web proxy server which controls and intercepts traffic between users and destinations such as for example remote servers such as on the Internet. Residing in a network, Internet, or web proxy server may be especially suitable for use in various environments such as: Internet service provider (ISP) to protect their users, or an enterprise to protect their employees, or a library to protect their patrons, or other entity's with a number of users to protect.

Alternatively, an embodiment of the invention may reside within a web browser application or operating system.

Also, the security agent may protect against other malicious attacks that attempt to deceive the user or hide details.

In various embodiments, the order of the operations discussed herein (e.g., with reference to various figures) may be changed. For example, operation 330, 332, 335 may occur before 329. Other examples of changing the order of operations are also possible.

FIG. 9 and FIG. 10 illustrate database tables that may be utilized in some embodiments to associate or bind together sensitive data and allowable destination information. Allowable destination information may contain server identification. The server identification may be composed of or derived from secure sources. The DestinationId field in the AllowableDestinations shown in FIG. 9 may identify an allowable destination for the SensDataId specified (which maps to the SensDataId in the SensData table shown in FIG. 10). The DestinationId field may be derived from the credentials or X.509 certificate obtained during secure authentication of the destination server. For example, in an online web browsing environment over a secure channel such as SSL/TLS the DestinationId may contain the server certificate SubjectKeyIdentifier extension or public key or the certificate signature or serial number or subjectAltName or some other secure identification of the server. The SensDataId field may be used to identify a sensitive data. The SensData table in FIG. 10 might map the SensDataId field to actual sensitive data in the SensData field. The values in the database tables may be defined sometime before the release of sensitive data.

In an embodiment of the invention each user may have a unique set of credentials to authenticate themselves to the security agent. This may be in the form of a username-password pair such as “MyMasterUsername” and “MyMasterPassphrase”. However, this may not be the only form of user authentication, other forms could also be used such as biometric, smartcard, question-answer, special URL, a bookmark, a HTTP header, shared secrets, or any combinations of the aforementioned techniques. Additionally, HTML forms may not be the only mechanism to be used for user to authenticate to security agent, but possibly Ajax, browser toolbar, browser sidebar, or right-click context menu.

A repository may store information for one or more users, where each user may have multiple sensitive data to one or more destination servers. For example, stored in the repository, one of the users may have multiple login account information allowed for one destination server, have different login account information allowed for other multiple destination servers, have credit card information for some of these or other allowable destination servers, and/or have personal details (such as drivers license information, mothers maiden name, health information, etc. . . . ) allowed for yet other destination servers.

Figure 11:
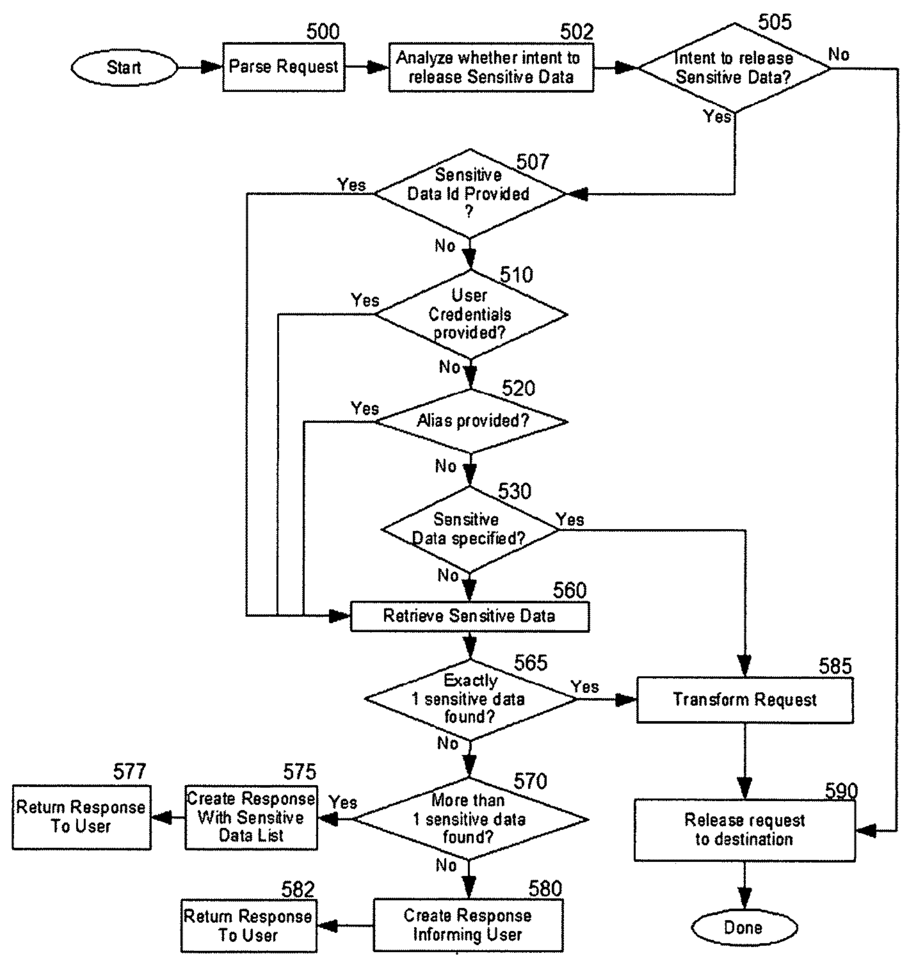
FIG. 11 is a flowchart diagram illustrating a method for processing HTTP requests from clients and determining which fields to replace with sensitive data, according to an embodiment.

FIG. 11 is an illustration of an embodiment of a security agent processing requests in an online web browsing environment where user intention to release sensitive data is detected and used to retrieve sensitive data from a storage repository and inserted into the request before it being transmitted to the destination. In this embodiment the HTML Form is used for two purpose: 1) user signals their intention to release sensitive data, 2) user provides some data to indicate which sensitive data to release. The request is parsed 500 and analyzed whether the intent to release sensitive data exists such as for example user providing authentication information, a sensitive data alias, a sensitive data id, or sensitive data 502 where if it is determined there is not intent to release sensitive data 505 then the request is released unchanged 590. If at operation 505 it is determined that there is intent to release sensitive data then next it is determined whether the sensitive data has been identified 507 and if so then the sensitive data is retrieved 560. If at operation 507 it is determined there is no sensitive data identified then next it is determined whether user credentials or authentication were provided 510 and if so then sensitive data(s) for the destination is retrieved 560. If at operation 510 it is determined no user credentials are provided then it is determined whether a sensitive data alias was provided 520 and if so then the alias is used to retrieve the sensitive data 560. If at operation 520 it is determined that no alias was provided then it is determined whether sensitive data was specified 530 and if yes then the sensitive data retrieved is used to transform the request 585. In an embodiment, if at operation 530 it is still not determined which sensitive data to release then the request is either further examined for details such as a flag, special URL, token, or it is assumed that the destination itself will be used in querying the storage device for any sensitive data available for the destination 560. After operation 560 the sensitive data retrieved is examined whether exactly one sensitive data was found 565 and if yes then the sensitive data is used to transform the request 585. If at operation 565 the sensitive data retrieved is not one then it is determined whether (in operation 560) more than one sensitive data was retrieved 570 and if so then a response is generated with a listing of sensitive data items 575 and returned to the user 577. If at operation 570 it is determined that (in operation 560) no sensitive data was retrieved then a response detailing this is generated 580 and returned to the user 582. At operation 585 the transforming of the request is further illustrated in FIG. 12. After the transforming of the request 585 the request is released to the destination 590.

Figure 12:
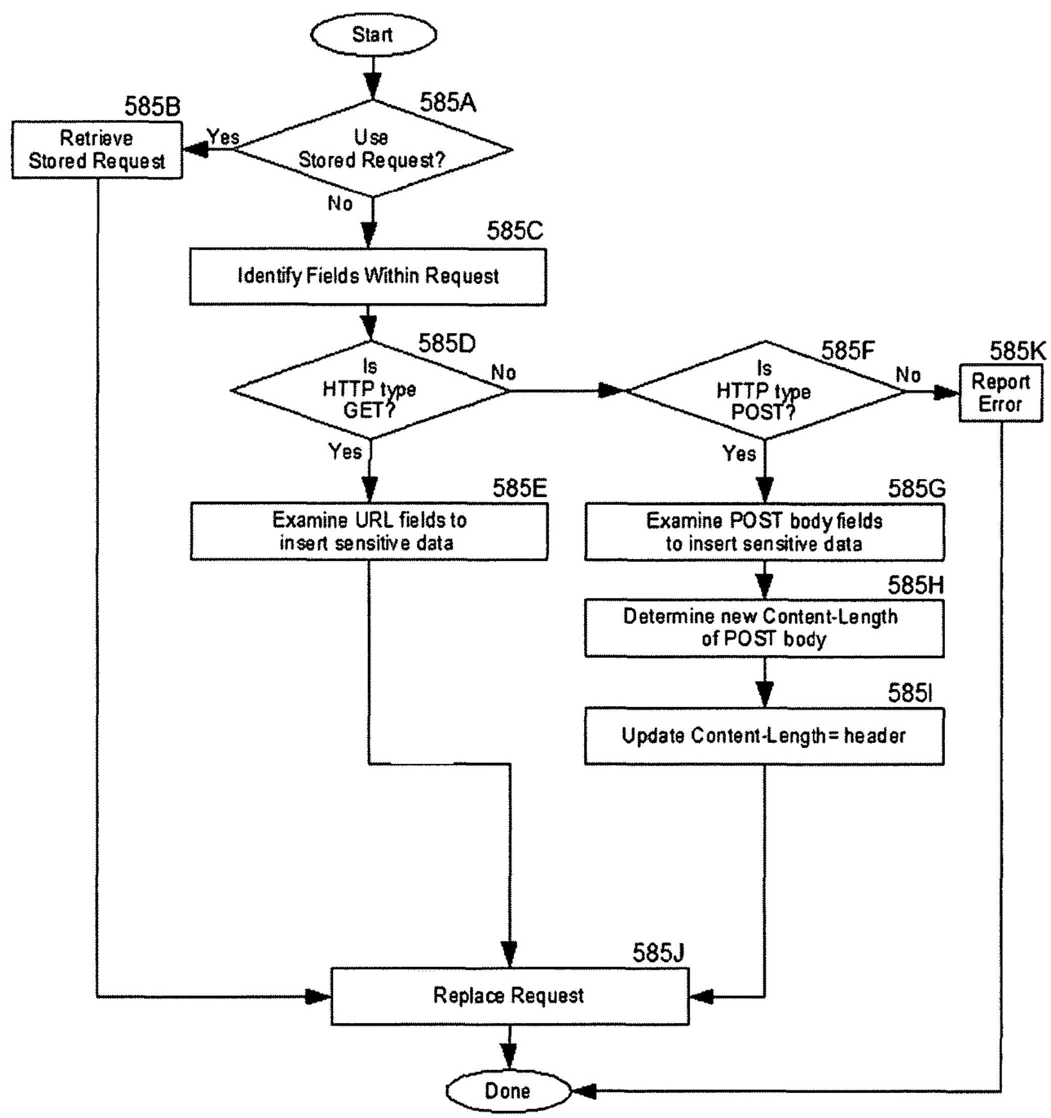
FIG. 12 is a flowchart diagram further illustrating operation 585 of FIG. 11 where the HTTP request is modified with the sensitive data, according to an embodiment.

FIG. 12 illustrates operation 585 of FIG. 11 in greater detail one embodiment of transforming the request with the sensitive data. In operation 585A it is determined whether to replace the request with a stored request and if yes then the stored request is retrieved 585B and the request is replaced 585J. If at operation 585A it is determined not to use a stored request then the fields within the request are identified 585C. The fields modified may be identified by the fact that they contain the user signal to release sensitive data, such as: sensitive data alias, user authentication, sensitive data identifier, or another sensitive data. Next the request is examined whether it is an HTTP GET request type 585D and if yes then for each field in the URL is searched and replaced if it is a field to be replaced with a sensitive data item 585E and the request is replaced 585J. If at operation 585D it is determined the request is not an HTTP GET type then it is determined whether it is a POST 585F and if so then for each field in the POST body is examined whether to be replaced with a sensitive data item and replaced if necessary 585G after which a new Content-Length is calculated 585H and the Content-Length header is updated 585I before replacing the request 585J. If at operation 585F the request type is not an HTTP POST then an error is reported 585K.

FIG. 13 is an example of a user signaling to the security agent the intent to release sensitive data. In this example the user has filled in their credentials of “MyMasterUsername” and “MyMasterUserPassword” (hidden behind *’s) to authenticate to one embodiment of the security agent. In one embodiment the security agent then looks up and replaces the “MyMasterUsername” with the users actual username or login id to the server, and similarly replaces the “MyMasterPassword” with the users actual password for the server. In one embodiment similar operations may occur after a website has timed out a users session and only a user’s password is required, the user may need to enter their password to the security agent and the security agent detects this and looks up the real password to the server and transforms the request appropriately. This may provide the benefit that the user does not need to provide more information again and possibly only one password.

Having the user fill in their credentials as in FIG. 13 is just one example of a user interface, another example may involve the user right-clicking and a list of sensitive data items being displayed for the user to choose from. Another example may involve the user invoking another application and selecting or specifying sensitive data there. Also, other choices may be available that interact with users to specify the sensitive data intended to be released.

As one may see by the example of FIG. 13, the user may need to remember one set of credentials to authenticate themselves to the security agent. This may improve usability since the user does not need to remember or specify any sensitive data. This may improve security since the user may not need to specify any sensitive data and malicious attacks such as keyloggers may be useless.

FIG. 14 is an example of a user signaling to the security agent the intent to release sensitive data using an alias to a particular sensitive data. In this example the user has filled in the alias of "MyBankAccount" and "MyMasterPassword" (hidden behind *'s) to signal their intention to release the sensitive data the alias "MyBankAccount" maps to. In one embodiment the security agent then looks up and replaces the "MyBankAccount" with the users actual login id to the server, and similarly replaces the "MyMasterPassword" with the users actual password for the server.

Note that FIG. 13 and FIG. 14 the login page originates from a less secure page (non-SSL or http: in URL bar), this further illustrates another advantage the security agent may provide—the user does not need to check the destination of hitting the "SignOn" button since the security agent will engage when determining whether to release the sensitive data to the destination and if the destination is an allowable destination then the sensitive data may be retrieved from storage and inserted or if the user provided the sensitive data then released to the destination.

The illustrations in FIG. 11, FIG. 12, FIG. 13, FIG. 14 show the user signaling or triggering their intention to release sensitive data to a destination and the destination may not need to be checked whether an allowable destination. The security agent may partly perform the functions of a password manager by removing the need for the user to possess or provide the actual sensitive data destined for the destination. The user may signal their intention to release sensitive data by providing one or more of: an alias to sensitive data, a sensitive data identifier, another sensitive data, or authentication information to the security agent. This signaling may be provided within an HTML Form itself and thus remove the need for another interface. As well using the HTML Form may provide an intuitive way of signaling release of sensitive data. As well using the HTML Form may provide backwards compatibility with existing websites mechanisms of obtaining user sensitive data (such as using HTML Forms). As well using the HTML Form may provide a mechanism for users to identify the fields of the HTTP request to the security agent to simplify its task of determining where to insert sensitive data. In some embodiments the HTML Form is used itself as a communications mechanism between the user and the security agent providing numerous user intuitive and backwards compatibility (with web browsers and web servers) benefits. In some embodiments the security agent monitors HTTP messages between the web browser and the destination web server, in particular the HTTP requests from the web browser (sometimes referred to as the sender), and the destination web server (sometimes referred to as the receiver). In some embodiments the security agent determines user intention to release sensitive data by their providing of one or more of: sensitive data alias, user authentication, sensitive data identification, some sensitive data itself (either the sensitive data destined for the destination or another sensitive data). In some embodiments the security agent parses and/or manipulates HTTP requests such as HTTP GET and HTTP POST messages. In some embodiments the user providing data within an HTML Form serves as dual purpose: 1) signaling of intention to release sensitive data, 2) the data identifies the sensitive data to be released.

In an embodiment, in using the security agent the user no longer needs to concern themselves with remembering or having knowledge of the exact details of the sensitive data but rather just indicates or signals to their security agent the intention to release sensitive data and in the appropriate form fields specify which data is which. The security agent may detect this intention and transform the request appropriately. Having the user identify which field is which removes this task from the security agent, thereby possibly simplifying implementation of the security agent.

As shown, FIG. 13 and FIG. 14 are examples of sensitive data release for a personal computer; however, one could just as easily have similar screenshots of portable computing devices accessing web pages for sensitive data release such as for example cellphones, RIM BlackBerry, Microsoft Windows CE, PDA's, Apple iPods, or other portable devices. For example, the traffic for a portable computing device may be configured so that a security agent has access to the traffic and either determine what sensitive data to insert into the request before releasing it to the destination, or whether a sensitive data (or portion of sensitive data) may be released to the destination. This may provide users with security improvements. This may provide users with usability improvements since the user may be able to provide simpler to enter data to the security agent (an alias, choosing a sensitive data item from a list, a special URL, a bookmark, or the like). This may provide usability improvements for users using relatively more restricted keyboards and instead of entering possibly cumbersome sensitive data instead being able to enter shorter or easier to enter data (such as for example an alias, a bookmark). In some embodiments the user may be able to use the same HTML Form to both signal intention to release sensitive data as well as providing the data. In some embodiments information about or from the device the user is using may provide the indication to release sensitive data such as for example a portable computing device a user is using identifies the user to the security agent (the security agent may possibly determine which sensitive data to release). This may provide users with usability improvements since users may not need to retrieve or lookup sensitive data themselves (such as for example using a cellphone while driving and needing to pull out a wallet and extract a credit card)—entering an alias or being identified by usage of or possession of a computing device may provide enough information for a security agent to perform its tasks.

In some embodiments the user may indicate their intention to release of sensitive data by providing sensitive data which the security agent detects and replaces the first sensitive data with a second sensitive data. For example the security agent may convert or translate the user provided sensitive data into another sensitive data. Some benefits of such an embodiment is:

- users do not need to know or be aware of what the actual sensitive data is or what is delivered to the destination,
- if the sensitive data is updated it may be updated at a central location without having to inform the user(s) since security agent can provide new sensitive data to destination,
- permission system where users are given different sensitive data for the same destination,
- two-layer of indirection is added. For example the sensitive data the user provides is not considered sensitive but rather a special phrase or shared secret.
- One entity may provide sensitive data to a second entity and the first entity is able to control the release of the sensitive data. For example, a personal proxy where a user provides sensitive data to another user and is able to control release of the real sensitive data to destinations.

In some embodiments the user may provide the sensitive data thus indicating intention to release the sensitive data to the destination. The presence of the sensitive data itself may be the user signal to release the sensitive data and the security agent needs to determine whether to release the sensitive data to the destination.

In some embodiments the user may indicate their intention to release sensitive data by providing an alias of sensitive data. This may provide the advantage that a user does not need to know or have possession of sensitive data. Another advantage is that the security agent may update the sensitive data without having the user needing to be notified. Another advantage is improved usability in that it may be easier for a user to enter an alias rather than a sensitive data. For example, instead of a user having to pull out their wallet and determining their credit card information and entering it, the user may instead provide an alias such as "MyCreditCard" or "WifesCreditCard", somewhat easier to enter as well as the security agent may have the latest or up to date credit card information as they are periodically renewed.

In some embodiments the user may provide a sensitive data identifier for the sensitive data to indicate their intention to release sensitive data. For example, the user is provided a list of sensitive data items that may be released or that are available either for the destination or in general and the user selects one and an identifier is provided to the security agent to detect which sensitive data the user intends to release to the destination.

In some embodiments a native application may be used to securely collect and store the sensitive data along with the associated server identification data into the data repository. A native application may be less susceptible to online or web browser attacks and may help reduce or even prevent various attacks such as cross-side scripting or phishing attacks during collecting and storing of the sensitive data.

In some embodiments a security agent is distributed by an organization to their members which ensure sensitive data with the organization is only released to the organization.

In some embodiments the security agent performs the tasks of identifying the server without using or requiring the SSL/TLS protocols. For example, the security agent identifies the server using IP addresses or Domain Names before deciding to release the sensitive data to the destination thus either ensuring the sensitive data is only released to intentional destinations or ensuring the sensitive data is not released to unintentional destinations.

The security agent may reside locally on a computer with the user or remotely over a computer network such as an intranet or Internet, The security agent may reside on a hardware device such as a network interface card (NIC) including devices that comply with the peripheral component interface standard and its various revisions including PCI, PCI-e, PCI-X, or the like.

The security agent may reside on a portable device or computer media such as a universal serial bus (USB) device or USB key, Firewire device, CD, DVD, floppy, Zip drive, tape, removable hard drive, cell phone, PDA. This may allow users to roam from computer to computer while still utilizing the security provided through some embodiments discussed herein. This might provide the following added advantages:

allowing users to carry their sensitive data with them allow users to access insecure computers while still be confident the information will not be released to an attacker or rogue entities provide added protection by securing the sensitive data when the computer is not in use. For example parents may unplug or remove the portable device and keep out of reach from children The security agent may be implemented in a firewall or network gateway.

The security agent may reside remotely from the user such as at a cell phone service provider, or at an Internet service provider.

The security agent may be part of or packaged with PC security software such as anti-virus, anti-spyware, anti-malware, anti-hacker.

During installation the data repository may be first created or loaded with some existing sensitive data such contained in the protected storage. The user may command or be queried whether the sensitive data is loaded or from where.

The software may come pre-installed with the trusted Certification Authority root data (such as X.509 certificates, or SSH key hashes).

An embodiment of the invention may store and retrieve the sensitive data and related data to and from a data repository. Some of the data may be cryptographically protected such as for example encrypted and/or digitally signed.

The association between server authentication and sensitive data may be made at the time of storing the information in the repository.

The sensitive data may be encrypted before storing in the data repository. This may provide protection should the data repository fall into the wrong hands.

The sensitive data may need to be initialized, that is collected and stored into a repository. The sensitive data may be specified by the user or may be generated. Rules may be used to be adhered to when the sensitive data is specified or created. A web browser or a native application may be used to initialize the data. For example, the user enters sensitive data once, thereafter actions are taken to ensure the sensitive data is only released to the same server.

The data initialization may occur through a separate native application that may interact with a database repository. This may provide enhanced security since the native application may not be susceptible to the same online attacks as a web browser.

The native application may determine and provide to the user additional information about the server to associate the sensitive data with such as geographical location, status check with an online service whether the server is on trusted or untrusted lists, trusted Certification Authorities lists, revocation lists checks, WHOIS queries, traceroute information, cryptographic strength of the server certificate or protocols or versions used, past history, analysis of certificate contents, or other relevant analysis. For example, the installed trusted root certificates may be checked against known trusted and known untrusted root certificates and findings reported to the user. Another example may be that other lists or services may be consulted such as those provided by the Better Business Bureau, TrustWatch, TRUSTe, ScanAlert, BizRate, or Verified by VISA. The findings of these may be reported to the user.

The native application may communicate with the data repository directly or through another service.

In some embodiments a web browser may be used to enter and initialize the sensitive data and associated identified server based on the secure authentication information.

In the case the sensitive data is generated, it may be generated on the client side such as in a computer or hardware device such as a smartcard, hardware token, or other computing device.

In one embodiment of the invention a trusted computer or station may be used in initializing the sensitive data and the associated destination servers.

In one embodiment of the invention the data may be retrieved or extracted from another repository or location and stored into the sensitive data repository. An example of where this may be used is in bulk loading of existing sensitive data.

In one embodiment of the invention the various data may originate from another user, this may include data such as the binding of sensitive data, and the identified server based on the secure authentication information.

In one embodiment of the invention a separate communication channel may be used to verify the secure server identification. For example, a user may telephone a service provider to obtain a hash or thumbprint of a servers SSL certificate before allowing procession of the binding of the sensitive data with the secure server authentication and identification.

In an embodiment, the destination server may not need to be identified based on the secure authentication by the user every time sensitive data is to be released. For example, in some instances the destination server may need to be identified based on the secure authentication by the user one time—when the association between sensitive data and the securely authenticated and identified server is first made and the data is then stored in the repository.

Further, the security agent may leverage existing technology in the current web security model to enhance security. Furthermore, the security agent may provide backwards compatibility with the current web security infrastructure. Little if any changes are required to the web security infrastructure. Providing the possibility of backwards compatibility may provide several benefits, one benefit being less reluctance to adopt since users have control over which destinations they use the security agent with.

Also, the security agent may provide added control to the user over their sensitive data by securing their sensitive data. Furthermore, current attacks may be reduced or even prevented altogether.

In an embodiment the security agent may be used to enhance security because the destination of the HTML form may be unknown, not visible, or otherwise indeterminable to a user. Some servers may provide to the user the HTML form over an insecure link (e.g. http) but the intended destination of the HTML form submittal is to a secure destination (e.g. https). Some users may not understand the various security details and even be tricked into providing their sensitive data. The security agent may enhance security by securely authenticating and identifying the destination and ensuring the destination is an allowable destination for the sensitive data.

Each sensitive data may have an associated type. This may be used for a variety of purposes such as for example in the security assessment of a server connection and whether the sensitive data may be allowed to be released to the server. The example table in FIG. 10 provides a Type column for the data type.

The allowable destinations may be implemented using various data structures such as for example lists, trees, arrays, sets, hashtables, or any other appropriate data structure that provides the ability to associate or bind data between sensitive data and destinations. Similarly for non-allowable destinations, they too may be implemented using any appropriate data structure.

Various factors may all contribute when performing the security analysis of a server such as the probability that the service is who they claim to be, who the client believes they are authenticating with, the machine the user is operating on is sufficiently secure, the security strength weighed against the type of transaction being performed, or any other measurable security-related facet of a secure connection.

The following are some of the factors that may be used in the security analysis:

Type of sensitive data

Age of domain name. For example, newer domains may be more likely to be a phishing domain Geophysical location information of server WHOIS Information Traceroute or network routing information Domain top level domain (e.g. .com, .ca, .ru, etc. . . . )

destination certificate (such as for example the servers X.509 certificate). Including details such as date of issuance, issuer, CRL or CDP location.

Certificate issuer

Any certificate in the certificate chain

CRL's and ARL's

Trust lists (this may include trusted server destinations such as IP addresses, DNS names, URLs, WHOIS information, server certificates, public key, geo-location)

Matches a certificate in a stored certificate repository

Security strength of protocols, algorithms, key sizes, etc. . . . used by server As well a remote service may be queried to provide the security analysis or some of the information of the destination server. Alternatively the remote service may be located within the same computing device, or within the same local network as the user, or over a connected network such as the Internet. The remote service may be contacted periodically to download information, or be queried at the time of the analyzing the destination server. For example, the age of certificate issuance may deem a more recently issued certificate as more risky since a bogus certificate may not be detected or revoked yet or new CRL issued or accessible yet.

The use of automatic exclusion lists may be used to bypass performing the security analysis actions. If the target of the request is found on an exclusion list the sensitive data may automatically be released. These actions may enhance performance by reducing processing required.

In some embodiments, upon initial use, the users may need to authenticate themselves.

Further, a timeout may occur after a period of inactivity and the user may be logged out. If the user requests further use after this timeout they may need to re-authenticate themselves.

Multiple users may use the same security agent simultaneously. Also, each user may have unique set of authentication credentials used to authenticate themselves to the security agent.

The security agent may accept various types of user authentication such as for example HTML form, Basic, Digest, biometric, Windows domain, cookies.

An embodiment of the invention may be used with client certificates to provide mutual authentication to function in addition with deciding whether to release sensitive to the destination.

The trust lists may be automatically retrieved on a periodic schedule or be manually retrieved by the user. The trust lists themselves may be generated by a centralized service or by other members of a community.

An embodiment of the invention may capture and archive information sent by the client to the server. Also, the sensitive data may be specified by the user.

An embodiment of the invention may archive sensitive data and the associated servers released to. This may provide several benefits including, for example, one or more of the following:

user may be alerted to released passwords/accounts that have not been used in more than a specified amount of time the user may be alerted when a website is hacked and the user previously released sensitive data to that site being able to query when and where sensitive data was released to Using stored sensitive data, an embodiment of the invention may detect the attempt to transmit sensitive data to unintentional servers. For example, a password sent to one server may not be intended for another server to possess and appropriate actions may be taken to prevent or allow this.

Additionally, an embodiment of the invention may recognize common data patterns in outgoing data and take security measures to ensure their proper release. For example, credit card numbers often begin with a common set of numbers, before such a recognized data pattern is released a user may be queried or alerted of this happening.

The security agent may authenticate itself to the client. For example this authentication may be performed using SSL certificates that may be created one time or generated dynamically.

In accordance with some embodiments, the security agent discussed herein may be used to enhance security by reducing or even preventing online fraud and malicious attacks such as for example phishing, pharming, DNS hijacking, arp poisoning, man-in-the-middle, web browser exploits, cross-site scripting, human errors, redirection. Additionally the security agent may enhance security for users using not completely trusted systems or networks such as WiFi hotspots, hotel networks, library terminals.

In some embodiments of the invention the user is provided the ability to load existing sensitive data so that the user may forget or throw out knowledge of the passwords, or at a minimum know they will not need to routinely provide this information any longer. This mechanism may provide benefits by being backwards compatibility with existing web sites thus not requiring effort or changes by the website owners.

In some embodiments the security agent provides sensitive data management and thus the user is freed from one or more of: worrying about security issues, remembering or having knowledge of the sensitive data, providing sensitive data, etc.

The sensitive data may be stored in plain text or in encrypted form. For example, the sensitive data may be encrypted using a key derived from the users passphrase.

An embodiment of the invention the sensitive data may be considered to belong to a user. For example, a user may have various sensitive data such as passwords, credit card information, driver's license information, etc. . . .

An embodiment of the invention the security agent may provide separation between sensitive data and users. This may be beneficial in an enterprise or business setting where the sensitive data may be considered to belong to a business or enterprise. This separation of users and data provides control over the business' sensitive data so that if employees or users leave the business or enterprise then the business retains possession and control over the sensitive data. For example, a business may have various sensitive data such as passwords, business secrets, source code, business operational details, etc. . . .

The user may have credentials to identify themselves to the security agent. The security agent may detect and examine the user credentials to further allow or disallow operations.

Additionally, an embodiment of the invention may provide auditing information and upon request produce information on who the sensitive data is released to. This may be useful for enterprises who need to provide this information to adhere to policy.

Additionally, an embodiment of the invention may store and produce upon request a list of dates for the release of the sensitive data. For example, websites which the user previously visited but no longer has use for and may now wish to disable or cancel the account.

In some embodiments the security agent may first modify the request before delivering it to another component or entity. The request may be modified by inserting sensitive data into the request.

In some embodiments the security agent may deliver the request or the modified request to the destination.

In some embodiments the security agent may allow another component to deliver the request or the modified request to the destination.

Figure 15:
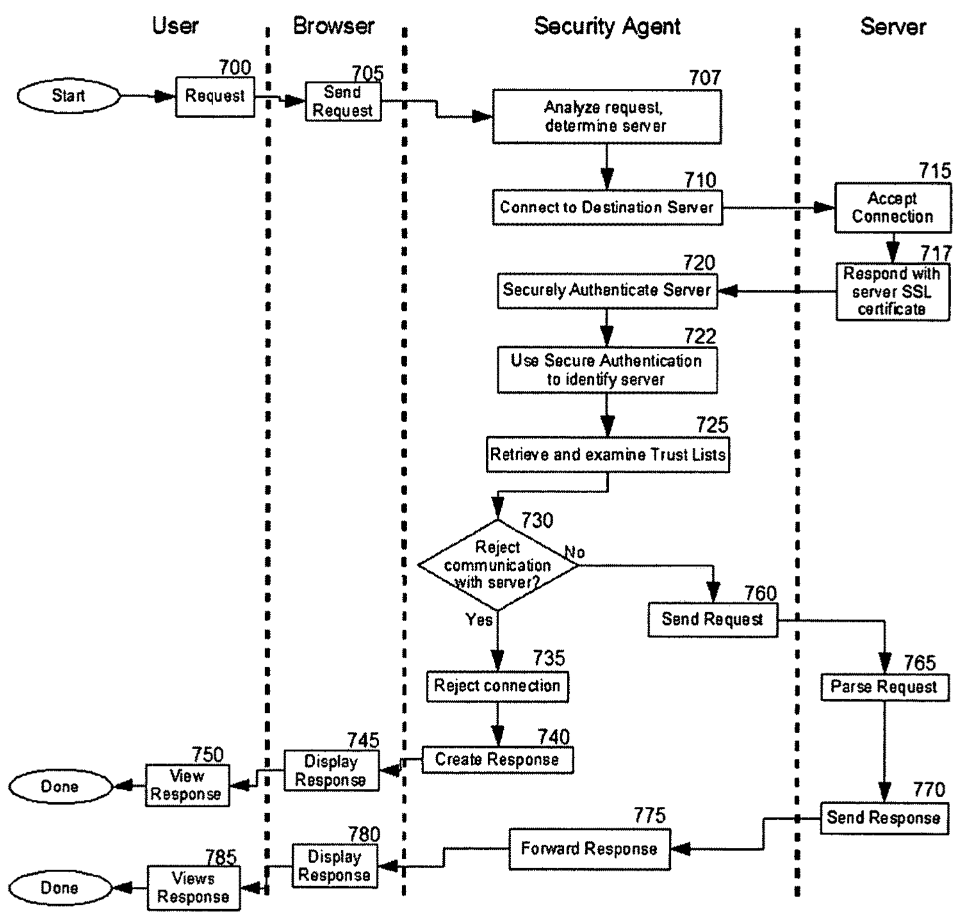
FIG. 15 is a flowchart illustrating one embodiment where the server authentication is used in determining whether to allow the client communications to progress.

FIG. 15 illustrates one alternative embodiment where the server connection is analyzed and determined whether communications are allowed with the server to occur. The user creates the request 700 and commands the web browser application to send the request 705. The security agent analyzes the request and determines the server to connect to 707 and opens a connection to the server 710. The server accepts the connection 715 and generates a response containing among other items the servers SSL certificate 717 which the security agent uses to securely authenticate the server 720 where this secure server authentication is used to identify the server 722 which then may be used to then to query whether the server is a trusted server or not 725. Next it is determined whether to disallow further communication with the server 730 and if not then to reject the request and possibly close the connection 735 before creating an appropriate response to return to the client 740 which the browser displays 745 and the user views 750. In the case of SSL/TLS for the operations of 710, 715, 717, 720 may involve SSL/TLS handshaking (see FIG. 3 for more details).

If at operation 730 it is decided to allow communication with the server then the request is allowed to pass through and is sent on to the server 760 where the server parses and handles the request 765 before sending the appropriate response 770, where the security agent forwards the response 775 to the browser which displays it 780 for the user to view 785.

The embodiment discussed with reference to FIG. 15 may have several practical uses. One example of this embodiment may be as a service that compiles trusted and untrusted lists of servers, then later as connections are opened the compiled lists are consulted and if an untrusted server is detected the connection is closed or the user is alerted. The service may make use of a honeypot in collecting and compiling the trusted and untrusted lists of servers.

Figure 16:
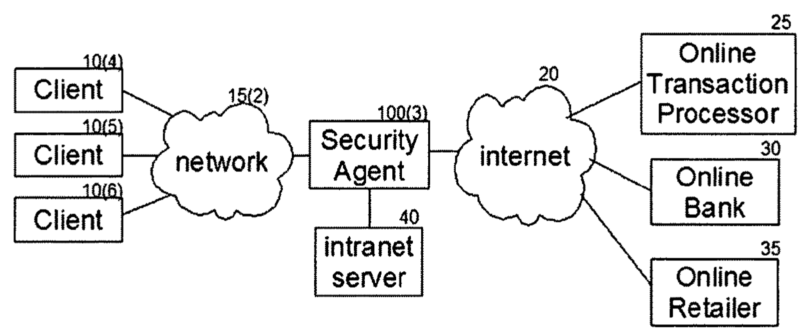
FIG. 16 is a network view of one embodiment where the security agent is accessed over a network.

FIG. 16 illustrates one embodiment where the security agent 100 resides over a network 15. This may allow multiple clients 10 to all access the same security agent 100. A variety of destinations are available for the sensitive data to be released or transmitted to such as for example an online transaction processor 25, an online bank 30, an online retailer 35, or an intranet server 40 or the like.

The security agent may be implemented as a proxy, or as a web service, or as a service within a domain, or use another protocol to communicate with or query the security agent whether a specific server should be trusted with release of some sensitive data. One example where this type of embodiment may be used is by enterprises to provide security services for their users and the enterprise controls a centralized security agent. This may provide enterprises the ability to block sensitive data from being further released in the event of for example an employee laptop being stolen, or an employee leaves the enterprise. Another example where this type of embodiment may be used is by service providers looking to provide enhanced security functionality such as ISP's, libraries, cell phone service providers, Internet hotspots, secure terminals. Another example where this type of embodiment may be used is in offloading processing requirements to a remotely located security agent with higher processing capabilities from client devices such as for example cellphones, PDAs, RIM BlackBerry, Microsoft Windows CE, Apple iPods, or other portable computing devices. Another benefit of a remotely located security agent is the ability for an organization to service multiple users and a heterogeneous mixture of client platforms and versions (PC's running various versions of hardware and operating systems, portable computing devices, cellphones, networked devices, and the like).

In some embodiments, the functionality of a security agent may be split up or separated into components that may perform various operations to determine destinations of sensitive data and/or help ensure sensitive data is released only to intentional destinations. One or more of the components may or may not interact with each other. One or more of the components may one or more may interact with one or more destinations of sensitive data. One or more of the components may interact with a storage device to lookup data needed to help ensure sensitive data is not released to unintentional destinations and/or only released to intentional destinations. The storage device may be remote or local to one or more of the components. One or more of the components may be remote or local in relation to a web browser. One or more of the components may be remote from each other. Some of the components may reside in a firewall, network router, network appliance, or the like.

Figure 17:
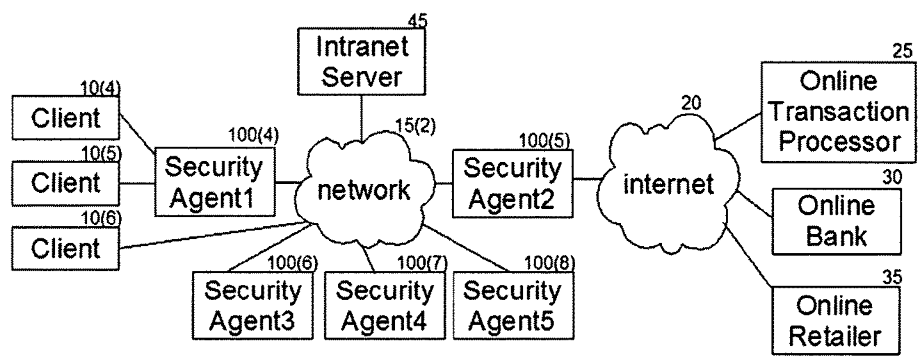
FIG. 17 is a network view of one embodiment where the functionality of the security agent is split up among several components.

FIG. 17 is an example of an embodiment illustrating some or all of the functionality of a security agent operating split up or separated into multiple components. However some embodiments the functionality of the security agent may be implemented with less than five components. Also, similarly in some embodiments the functionality of the security agent may be implemented using more than five components. A plurality of clients 10 may use a security agent 100(4) that has access to user interaction or network traffic. A security agent 100(4) may be implemented as or be contained within for example a web browser extension, web browser toolbar, native application, web proxy, or the like. A security agent 100(5) may identify destinations such as for example connecting to and/or performing handshaking operations with destinations. A security agent 100(6) may make a determination whether or which sensitive data to release to a destination. A security agent 100(7) may transform requests with sensitive data. A security agent 100(8) may release and/or transmit a request to a destination. One or more security agent 100 may have access to a storage device or memory unit that contains data used by one or more of the security agents. A variety of destinations are available for the sensitive data to possibly be released or transmitted to such as for example an online transaction processor 25, an online bank 30, an online retailer 35, or an intranet server 45 or the like.

Figure 18:
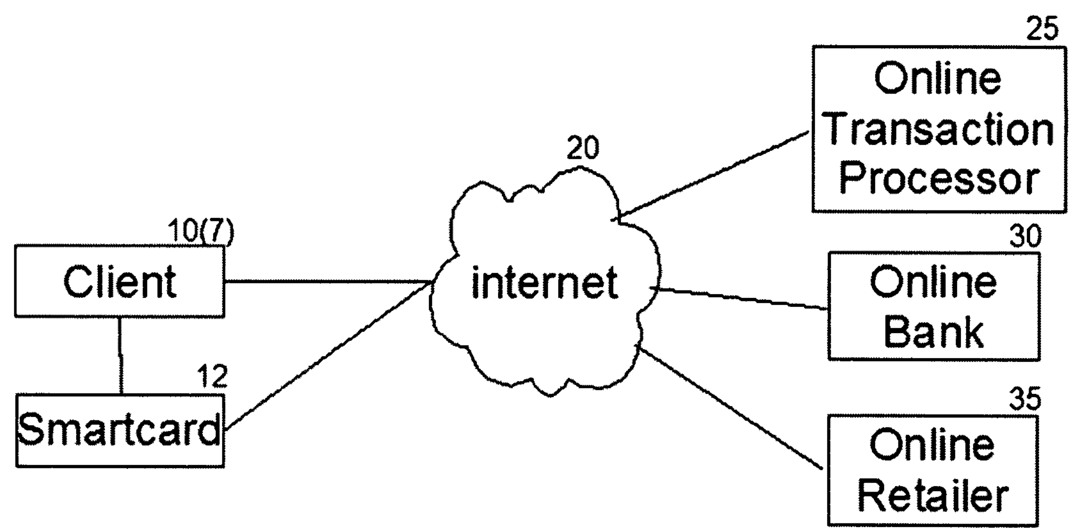
FIG. 18 is a network view of one embodiment where the security agent is embedded in a smartcard or hardware token.

FIG. 18 illustrates one embodiment where the security agent functionality is provided within a smartcard or hardware token. Release of sensitive data to a malicious attacker is prevented by ensuring release the sensitive data is released to a securely authenticated and identified server. Requests may be routed through the smartcard, that is the smartcard may act as a proxy between the user and the server. The client 10(7) commands or requests a smartcard 12 to release the sensitive data over a network such as the Internet 20 to a secure server such as an online transaction processor 25 online bank 30 online retailer 35 or others. The sensitive data initialization may take place on a trusted system. The security agent on the smartcard 12 securely authenticates and identifies the server in order to determine whether to release the sensitive data. The security agent on the smartcard or hardware token may transform the request by inserting sensitive data into request before sending it to the secure server. This embodiment may be useful in scenarios requiring highly secured operations such as online banking Smartcards or hardware tokens by their very nature may be considered to provide enhanced security. For example, an embodiment on a smartcard or hardware token may handle the SSL/TLS sessions on board and ensure the sensitive data is only released to intended destinations and/or not released to unintended destinations thereby providing some of the advantages discussed herein as well as possibly hampering rootkits on the system being used.

In one embodiment the user instructs the security agent to navigate to a destination server in order to release sensitive data. To instruct the security agent the user may open a list of allowable destination servers and select one, or the user may specify a destination server to the security agent directly such as through a command line prompt. For example, a user may open up a list of sensitive data items, select one, then be provided with a list of allowable destinations for the sensitive data from which the user may select one for the security agent to communicate with before releasing the sensitive data. An advantage of this embodiment may be to not require to direct a web browser to navigate to the website.

In one embodiment the user interacts with a security agent directly in order to release sensitive data. An advantage of such an embodiment may be to allow sensitive data be released without requiring an external application such as a web browser.

In some embodiments the security agent interacts with the user using some input and/or output devices. The input devices may include a keyboard, a pointing device, or other input device for users. The output devices may include a display screen, audio speaker, or other output devices for users.

In one embodiment a second factor authentication device is used to trigger or signal intention to release of sensitive data. For example, in an online web browser setting, a smartcard or hardware token is inserted by the user when visiting a website or page and is used by the security agent as a signal by the user of their intention to release sensitive data to the website.

In one embodiment the functionality of the security agent and the data repository containing the sensitive data may reside on a non-writable media or device. One useful scenario for this embodiment might be accessing an online institution and the media or device is provided to the user with all data pre-installed and possibly non-writable. The data may include a list of trusted root certificates, and/or the sensitive data repository, and/or a list of allowable destinations for some or all of the sensitive data. The non-writable media or device may be a live-CD that contains all of their sensitive data and which the user may use to boot a computer and safely access the online institutions. The user may carry the live-CD with them to use on systems or networks that the user does not fully trust, however the security agent on the live-CD provides confidence that it will perform the security measures to ensure the sensitive data is not released to unintended destinations and/or sensitive data is only released to intended destinations. One or more of the advantages of such an embodiment may be:

- remove the need for additional anti-virus or anti-spyware software
- provide portability
- allow user to safely use insecure systems
- relatively low cost (for example organizations may mail out the portable media to multiple members for relatively low cost)

In one embodiment the functionality of the security agent and the data repository containing the sensitive data may reside on a non-writable media or device and used in an existing operating system. For example, a read-only CD containing the security agent and the data repository may be inserted into a computer and the user is able to interact with the financial institution(s) stored within the data repository.

In one embodiment a non-writable media or device may contain code to ensure secure communications with a remote service which provides the functionality of the security agent. For example, the user has in his possession a read-only CD that contains a security application and key to ensure communication with a remote service that performs checks of the destination server before release of sensitive data. This may provide enhanced security for users while at the same time providing users with portable security.

In some embodiments of the invention a user may use a security agent but also need to provide additional authentication information (such as for example password, biometric, smartcard, question-answer) to further authenticate and/or identify themselves to the destination server. By both the security agent and the user providing authentication and/or identification information to the destination increased security may be provided.

In one embodiment the security agent may reside on portable computing devices with some form of network connectivity such as for example a cellphone, RIM BlackBerry, PDA, or Microsoft Windows CE device. An embodiment of the invention may be integrated directly into the portable device or otherwise be situated such that it has access to the data traffic. For example, access to the data traffic may be intercepting it between the user and the server. In addition to the various security attributes discussed this embodiment may simplify the entering of sensitive data by identifying the user based on identifying the user of the hardware.

In one embodiment the security agent may reside on a portable removable device and a set of users share the same portable removable device containing the security agent. This may provide a simple and effective technique for sharing the sensitive data. One example might be sharing passwords to authenticate to a server. The user retrieves the key from a locked closet or drawer, inserts it into the machine, enters their user authentication information (typically username and password), the security agent determines whether the user has access privileges to release the sensitive data, then determines whether the requesting service also has access for the sensitive data in question, then the user removes the key and places it back into protected physical storage.

In one embodiment the security agent may reside in a terminal, workstation, or other appliance.

In one embodiment the security agent may reside in a secure terminal, secure workstation, or other security appliance.

In one embodiment a first server accepts requests from users where the requests query whether to trust a second server with specific sensitive data. The first server may connect to, authenticate and identify the second server and provide information to the requesting user. The communication between the user and the first server may take place online or over another communication channel such as for example a telephone.

In one embodiment a first server accepts requests from users where the requests query whether to trust a second server with specific sensitive data. The first server may provide to the user the authentication and identification details of the second server. The communication between the user and the first server may take place online or over another communication channel such as for example a telephone.

In one embodiment a first server accepts requests from users where the requests query whether a second server is a trusted server. The first server may connect to, authenticate and identify the second server and determine whether it is trusted or not. The communication between the user and the first server may take place online or over another communication channel such as for example a telephone. For example, a user may telephone a service and communicate the destination server information, the service may perform security authentication and identification of the destination server and determine whether the user may trust the destination server and then provide this information to the user.

In one embodiment, at least some of the functionality discussed herein may be integrated directly into a web browser software application or as a web browser extension. This may remove the need for another process or application to run, and additionally may provide performance improvements as well as enhanced usability.

In one embodiment, at least some of the functionality discussed herein may be implemented as an ActiveX control, as a Java applet, as a MIME content encoding, Windows login script, or otherwise be downloaded or pushed down to the user through another mechanism. For example, a bank site may push down or even possibly install an ActiveX control which embeds some of the security agent functionality and ensures sensitive data is not released to unintentional destinations and/or ensuring sensitive data is only released to intentional destinations.

In one embodiment, at least some of the functionality discussed herein may be implemented as web browser script such as JavaScript or Flash.

In one embodiment, at least some of the functionality discussed herein may be inserted by an intermediary on the network. The intermediary may or may not be done transparently without the users knowledge. For example, in an enterprise setting where all traffic is routed through a centrally controlled node, the security agent functionality is inserted transparently and unbeknownst into web pages and provide benefits for the enterprise or user.

In one embodiment, at least some of the functionality discussed herein may be integrated directly into a web browser toolbar. This may provide enhanced usability or performance.

In one embodiment, at least some of the functionality discussed herein may be integrated directly into an operating system. For example, some operating systems provide networking class libraries for various applications to build upon. One benefit users may receive from such an integrated solution is having the software already installed. Another advantage may be that any application may make use of techniques discussed herein either directly or transparently. Another advantage may be improved performance.

In one embodiment, at least some of the functionality discussed herein may be provided in the form of a software toolkit that provides developers easy access to functionality without needing to implement the functionality themselves.

In one embodiment, at least some of the functionality discussed herein may be built into or embedded in computer hardware equipment such as a laptop, or a network card, or a biometric device, or a smartcard, or a hardware token, or a cable TV box, or a web TV box.

An embodiment of the invention provides end users enhanced security to protect their sensitive data from being unintentionally released. An embodiment of the invention achieves this enhanced security by leveraging the existing security infrastructure thus not requiring changes to servers. By identifying the server based on the secure authentication of the server the security agent may be able to provide enhanced security and reduce some of the malicious attacks.

An embodiment of the invention solves the problem from the users perspective and operate client side in the sense that security agent alleviates tasks from the user. By operating client side and identifying the destination before releasing sensitive data to the destination one or more advantages may be provided such as:

- improving security by only releasing to intended destinations
- improving usability and security by removing need for users to identify the destinations thus eliminating the possibility of human error or forgetfulness
- improving usability by not requiring user to have to remember or specify sensitive data
- improving usability by not requiring user to perform operations such as examining credentials and identifying the destinations are indeed who they intend to release sensitive data to such as for example examining SSL server certificates and/or their certificate chains
- improving security by removing the possibility of user being tricked or through attacks such as for example phishing, pharming, man-in-the-middle, trusted root certificate manipulation, or other security attack.
- improving usability since it may be easier for users to enter their authentication or an alias to a security agent rather than specifying real sensitive data. For example this may be especially true in constricted environments such as cellphone or portable devices with keyboards requiring more effort to use
- improve performance since automating operations (such as identifying destination) may provide efficiency
- centralized control over sensitive data since the sensitive data may be separated from users such as for example employees within an enterprise Some embodiments of the invention do not rely on visual indicators to provide the enhancements to the user. The success of some online fraud attacks have shown sometimes visual indicators may fail and may be vulnerable to attack. There are many attacks which may prey upon weaknesses of the security infrastructure, for example: trusted root certificate manipulation, pharming, self-signed certificates, Additionally there are attacks which may prey upon visual indicators that users rely on. For example, users may see trust indicators in their web browser and incorrectly decide to trust a potentially malicious destination.

In some embodiments the security agent may reduce the usefulness of key loggers obtaining sensitive data by having the security agent insert the sensitive data into the request Some embodiments of the invention make use of the existing security infrastructure and therefore may be used by businesses and users currently without any delays or requirements for existing servers to change anything on their end. For example, using the servers SSL certificate to identify the server based on secure authentication means that a security agent may be used with today's existing web servers with SSL/TLS without changes to the servers. However, this does not limit the security agent to strictly SSL/TLS authentication of servers.

Also, the security agent may be used in conjunction with other anti-online fraud solutions such as those deployed on the backend servers, or other solutions which require users to confirm transactions or authenticate using another channel such as SMS messages.

An embodiment of the invention may solve the online fraud problem at the one point where it may be solved for all applications, e.g., at the last possible moment before the data is sent. This may provide the advantage that the security agent may not be limited to just email specific. Thus the security agent may be considered as one single point of solving a variety of attacks.

Also, embodiments of the invention are not limited to strictly web browser environment but may be applicable and useful across many environments and scenarios.

Some embodiments of the invention provide the advantage of being flexible and useful in a variety of environments such as for example personal computer web browser, cellphone, business service provider, enterprise environment servicing employees, native client-server applications.

An embodiment of the invention provides end users enhanced security to protect their sensitive data being unintentionally released by integrating with password management software. By identifying the server based on the secure authentication of the server the security agent may be able to provide enhanced security and reduce some of the malicious attacks.

An embodiment of the invention will prevent data leakage by ensuring sensitive data is not released to unintentional destinations, and/or ensuring sensitive data is only released to intentional destinations.

Some embodiments of the invention provide end users enhanced security to protect their sensitive data from being unintentionally released by integrating into or with web browser software. By identifying the server the security agent may provide enhanced security and reduce or even eliminate some malicious attacks. For example, the functionality provided by binding sensitive data with server identification and integrating with protected storage of Microsoft Internet Explorer may provide benefits such as for example increased security.

Some embodiments of the invention provide enhanced usability by having the security agent identify the server thus reducing the effort or tasks required by users.

An embodiment of the invention may be implemented as a web server extension. The user may manually configure their web browser to direct web traffic through the web server running the inventions' module, or else this is performed using some automatic means such as by domain or group policy. Examples of web server extensions include but not limited to CGI applications, Apache modules or filters, Netscape Server API (NSAPI) extensions, Microsoft IIS (ISAPI), J2EE Filter.

An embodiment of the invention may target parents as the users and provide parents with the ability to specify ahead of time which destination sites their children are allowed to release sensitive data to. When the children use the security agent it ensures the sensitive data is only released to the destination sites the parents specified. This provides parents control over sensitive data while also protecting their children.

An embodiment of the invention the users repository is either pre-configured or the repository is dynamically updated with sensitive data and a corresponding list of server identifications allowable for the sensitive data. For example, a list of banks, health care, financial institutions and possibly even including corresponding icons) are stored in the repository. Some of the sensitive data may be provided or dynamically updated. This would provide users with the ability to easily connect to destinations by pushing on a link or button to connect to a specific destination server and the security agent to determine whether the sensitive data may be released or not.

An embodiment of the invention may bind sensitive data with network or similar identification of a destination to ensure at release time the sensitive is either provided to intentional destinations, and/or is not provided to unintentional destinations. For example, sensitive data may be bound with IP addresses, DNS names, URLs, bookmarks, WHOIS information, geo-location, shared secrets, server certificate, public key, certificate chain, or any combination or derivation of any of these.

The following is a list of some of the attributes of some or various embodiments of the invention:

- enhanced user security—ensures the server is allowed access to the users sensitive data
- improved usability—users do not need education on examining SSL certificate chains
- confidence—users do not need to worry about various attacks (cross-site scripting, redirection, browser flaws, security holes, etc. . . . ). The user may relax with peace of mind knowing their security agent will ensure adequate security
- convenience—security agent may provide sensitive data management
- improves security in generic manner—one embodiments of the invention solves the problem at one choke point—the latest possible opportunity (when releasing sensitive data).
- backwards compatible—works with existing security infrastructure
- platform neutral—may be implemented to work with virtually all browsers and operating systems (OS), and portable computing devices (such as cellphones, RIM BlackBerry)
- portable—in an embodiment of the invention the user may carry their user authentication information with them thus allowing users the same access from home, office, library, university, friends PC, etc. . . .
- flexible enough to allow users to specify the sensitive data and prevent release to unintended destination servers and/or allow a security agent to lookup the sensitive data and help prevent release to unintentional servers
- flexible enough to work in various environments, online web browsing over SSL/TLS is just one specific instance
- provide security on insecure systems—users may be provided added security to allow them to use insecure systems or networks such as for example Internet cafe's.
- leverage existing infrastructure—may not require changes to the existing infrastructure such as the backend servers
- easy integration—some functions discussed with reference to some embodiments may be integrated into multiple products (firewalls, web proxies, OS, web browsers, in conjunction with toolkits, cell phones, ISPs, VPN's, etc. . . . )
- simple mutual authentication—does not require client certificates nor changes to backend servers
- allow mutual authentication—if desired mutual authentication such as client certificates may still be used in conjunction with the invention
- less forgotten passwords—the password management capability decreases the amount of passwords users forget. Additionally, often these passwords were reissued over insecure and interceptable channels such as email, the security agent may reduce these attack options
- centralized management—for organizations supporting multiple users, maintenance (upgrades, patches, policies, password polices) may all be performed on one location. For example, an enterprise need not upgrade or patch all user desktop web browsers when another specific flaw is found
- centralized control over sensitive data—in some embodiments the sensitive data may be controlled or administered from a central location
- flexible deployment—able to support various environment configurations: home, enterprise, ISPs, libraries, universities
- flexible form—An embodiment of the invention may be run from any computer media or equipment such as USB key, a CD, a DVD, a computer hardware card (PCI card, PCI-express card, ISA card, EISA, SCSI device, IDE device, Ethernet card, wireless router, wireless device, modem, bluetooth device, etc. . . . ), CPU
- automatic updates—users do not have to continuously keep up to date on warnings/alerts on latest attacks or untrusted servers. An embodiment of the invention may automatically update itself
- co-existable with other solutions—An embodiment of the invention may co-exist and work with other security systems (e.g. anti-virus software)
- auditable—information released to which entities may be recorded
- theft or loss protection—if the user authentication information is lost or stolen it is virtually unusable without the users security agent authentication. Similarly, an attacker needs two attacks: 1) users credentials to security agent, 2) physical possession of the media containing the security agent
- trusted CA's—configurable as to which trusted CA's are allowed
- intuitive—in an embodiment of the invention the user may have a more intuitive understanding by being able to carry a physical media
- preconfigurable—allows a list of servers to preconfigure the system with trusted server information

- recoverable—user has option of secure back ups in the case of loss or theft
- no client software installation—in some embodiments client software is not required to be installed
- chainable or hierarchy—able chain multiple instances of security agent together for added management and control layers
- safe against browser or operating system caches—since users do not enter sensitive data there is no cache to clean up
- secure repository—user authentication is stored securely using cryptographic means
- empowers the user—user has control over where their sensitive information is released to and possibly ensuring only to appropriate destinations Embodiments of the invention described herein are not limited to the above mentioned uses. The following is a list of some other possible uses:

- integration into Internet proxy servers (including Anonymous proxy servers)
- integration into single sign on solutions, typically on backend server may perform the functionality of some embodiments of the invention before releasing any sensitive data
- strong password management for servers. A physical key contains the security agent and the password information, the user obtains and inserts the key into an interface accessible by the server, authenticates to the security agent, and an embodiment of the invention authenticates the user and determines whether they have privilege to requested server and performs security analysis (at a minimum authenticates the server) before releasing the password to the server.
- One embodiment of the invention is integrated into third party security products possibly as an enhancement
- integrated with Microsoft Windows Protected Storage functionality or similar for other web browsers
- integrated with web browser auto-completion functionality
- ensuring a users bank PIN is released only to authenticated ATM
- authenticating Kerberos domains before releasing passwords (for example, prevent against an attack where a bogus Windows GINA is setup to capture user passwords transparently before allowing them access to the domain)
- authenticating a biometric devices (such as fingerprint readers, keyboards with biometric readers) before releasing the sensitive data to them One embodiment of the invention is integrated onto smartcards so that the server is authenticated before releasing sensitive data.

In various embodiments of the invention, the operations discussed herein, e.g., with reference to the figures may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:

a security agent configured to receive data, the received data corresponding to at least a portion of a message from a source to a destination, wherein a secure channel is established to the destination, and wherein the destination is authenticated using a public key certificate, and wherein the message comprises an indication to request release of a private sensitive data to the destination; and a storage device configured to store an indication of a relationship between the private sensitive data and the destination, wherein the relationship indication is to indicate whether the private sensitive data is allowed to be released to the destination; and the security agent is further configured to:

extracting the public key certificate used to authenticate the destination;

identify the destination by determining a destination identifier from the extracted public key certificate;

determine whether the relationship indication indicates a relationship between the determined destination identifier and the private sensitive data; and cause release of the private sensitive data to the destination based on the determination whether the relationship indication indicates a relationship between the determined destination identifier and the private sensitive data.

2. The apparatus of claim 1, further comprising a second security agent to communicate with the security agent to cause release of sensitive data to the destination based on the relationship indication.

3. The apparatus of claim 1, wherein the relationship indication comprises a list of one or more destination identifiers.

4. The apparatus of claim 3, wherein the security agent is further configured to check the determined destination identifier against one or more of: a list of allowable destination identifiers for the private sensitive data or a list of unallowable destination identifiers for the private sensitive data.

5. The apparatus of claim 1, wherein a SSL (Secure Sockets Layer) channel or a TLS (Transport Layer Security) channel comprises the secure channel.

6. The apparatus of claim 1, wherein the security agent is to cause blocking of the private sensitive data from being released to the destination in response to a determination that the private sensitive data is not to be released.

7. The apparatus of claim 1, wherein the security agent is to cause at least a portion of the private sensitive data to be inserted into the message.

8. The apparatus of claim 1, wherein a web proxy, a web browser, a cellphone, a client application, a web browser extension, a web browser toolbar, a native application, a web browser script, a JavaScript script, or a Flash script comprises the security agent.

9. The apparatus method of claim 1, wherein a portable computing device comprises the security agent.

10. The apparatus of claim 1, wherein the determined destination identifier comprises one or more of: a public key certificate, a public key, a public key certificate subjectKeyIdentifier, an public key certificate authorityKeyIdentifier, a public key certificate serial number, a public key certificate chain, a public host key and certificate, a Domain Name Service (DNS) name, an Internet Protocol (IP) address, a Transmission Control Port (TCP) port, a User Datagram Port (UDP) port, a Media Access Control (MAC) address, network routing information, a Uniform Resource Locator (URL), bookmark, a Top Level Domain (TLD), a Whois information, a Geo-location, a shared secret, or an identity provider.

11. The apparatus of claim 1, wherein the indication to request release of a private sensitive data to the destination is the existence of the private sensitive data itself.

12. A method comprising:

monitoring, at a security agent, a message, the message being transmitted from a source to a destination, wherein a secure channel to the destination is established, and wherein the destination is authenticated using a public key certificate, and wherein the message comprises an indication to request release of a private sensitive data to the destination;

retrieving an indication of a relationship between the private sensitive data and the destination from a storage device, wherein the relationship indication is to indicate whether the private sensitive data is allowed to be released to the destination;

extracting the public key certificate used to authenticate the destination;

identifying the destination by determining a destination identifier from the extracted public key certificate;

determining whether the relationship indication indicates a relationship between the determined destination identifier and the private sensitive data; and causing release of the private sensitive data to the destination based on the determination whether the relationship indication indicates a relationship between the determined destination identifier and the private sensitive data.

13. The method of claim 12, further comprising checking the destination identifier, corresponding to the relationship indication, against one or more of: one or more of allowable destination identifiers for the private sensitive data, or one or more of unallowable destination identifiers for the private sensitive data.

14. The method of claim 12, further comprising the secure channel is a SSL (Secure Sockets Layer) channel or a TLS (Transport Layer Security) channel.

15. The method of claim 12, further comprising blocking the private sensitive data from being released to the destination in response to a determination that the private sensitive data is not to be released.

16. The method of claim 12, further comprising inserting at least a portion of the private sensitive data into the message.

17. The method of claim 12, wherein the private sensitive data includes or is derived from one of: a password, a financial information, a credit card information, a login credential, an HTTP Cookie, a session data, a private data, a personal data, or a user identification.

18. The method of claim 12, wherein the source includes one of: a user, a web browser, a cellphone, a client application, a web browser extension, a web browser toolbar, a native application, a web proxy, a web browser script, a JavaScript script, or a Flash script.

19. The method of claim 12, wherein the indication to request release of a private sensitive data to the destination is the existence of the private sensitive data itself.

20. The method of claim 12, wherein the public key certificate has an X.509 certificate format.

21. The method of claim 12, further comprising deriving the destination identifier from one or more X.509 certificate attributes.

22. The method of claim 12, wherein the public key certificate is one of the public key certificates in a public key certificate chain.

23. The method of claim 22, wherein the public key certificate chain is validated during establishment of a secure communication channel.

24. The method of claim 12, wherein the determined destination identifier comprises one or more of: a public key certificate, a public key, a public key certificate subjectKeyIdentifier, an public key certificate authorityKeyIdentifier, a public key certificate serial number, a public key certificate chain, a public host key and certificate, a Domain Name Service (DNS) name, an Internet Protocol (IP) address, a Transmission Control Port (TCP) port, a User Datagram Port (UDP) port, a Media Access Control (MAC) address, network routing information, a Uniform Resource Locator (URL), bookmark, a Top Level Domain (TLD), a Whois information, a Geo-location, a shared secret, or an identity provider.

25. A method comprising:

monitoring, at a security agent, an hyper-text transfer protocol (HTTP) request transmitted from a source to a destination, wherein the destination is authenticated using a public key certificate, and wherein the message comprises an indication to request release of a private sensitive data to the destination;

extracting, at the security agent, the public key certificate used to authenticate the destination;

determining a destination identifier from the extracted certificate, corresponding to the relationship indication;

identifying the private sensitive data requested to be released to the destination;

retrieving an indication of a relationship between the private sensitive data and the destination authenticated by the public key certificate from a storage device, wherein the relationship indication is to indicate the private sensitive data to be released to the destination;

determining whether the relationship indication indicates a relationship between the determined destination identifier and the private sensitive data;

retrieving, at the security agent, the private sensitive data based on the determination whether the relationship indication indicates a relationship between the determined destination identifier and the private sensitive data; and inserting, at the security agent, the retrieved private sensitive data into the HTTP request prior to release to the destination.

26. The method of claim 25, wherein the private sensitive data is inserted into the body of the HTTP request.

27. The method of claim 25, wherein the transmission is over a Secure Socket Layer (SSL) channel or a Transport Layer Security (TLS) channel.

* * * * *